(12) United States Patent
Iwaya

(10) Patent No.: US 8,956,768 B2
(45) Date of Patent: Feb. 17, 2015

(54) NONAQUEOUS ELECTROLYTE COMPRISING ONE OR MORE HYDROFLUOROETHERS AND ONE OR MORE NON-FLUOROETHERS, AND A SECONDARY CELL CONTAINING THE NONAQUEOUS ELECTROLYTE

(75) Inventor: Masao Iwaya, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 1177 days.

(21) Appl. No.: 12/893,300

(22) Filed: Sep. 29, 2010

(65) Prior Publication Data

US 2011/0020700 A1    Jan. 27, 2011

Related U.S. Application Data

(63) Continuation of application No. PCT/JP2009/058382, filed on Apr. 28, 2009.

(30) Foreign Application Priority Data

Apr. 28, 2008    (JP) ................................. 2008-116935

(51) Int. Cl.
*H01M 10/052*    (2010.01)
*H01M 10/0567*    (2010.01)
*H01M 10/42*    (2006.01)

(52) U.S. Cl.
CPC ........ *H01M 10/052* (2013.01); *H01M 10/0567* (2013.01); *H01M 10/4235* (2013.01); *H01M 2300/0025* (2013.01); *Y02E 60/122* (2013.01); *Y02T 10/7011* (2013.01)
USPC .......................................... 429/326; 429/199

(58) Field of Classification Search
CPC ................... H01M 10/0564; H01M 10/0566; H01M 10/0567; H01M 10/0568; H01M 10/0569; H01M 10/04235; H01M 10/052; H01M 2300/0025; H01M 2300/0028; H01M 2300/0034; H01M 2300/0037; H01M 2300/0088; H01M 2300/0091; Y02E 60/122; Y02T 10/7011
See application file for complete search history.

(56) References Cited

U.S. PATENT DOCUMENTS 5,916,708 A    6/1999    Besenhard et al.
6,210,835 B1    4/2001    Arai
(Continued)

FOREIGN PATENT DOCUMENTS

EP    0 807 986 A1    11/1997
EP    0 938 151 A2    8/1999
(Continued)

OTHER PUBLICATIONS

U.S. Appl. No. 13/209,002, filed Aug. 12, 2011, Iwaya.
(Continued)

*Primary Examiner* — Raymond Alejandro
(74) *Attorney, Agent, or Firm* — Oblon, Spivak, McClelland, Maier & Neustadt, L.L.P.

(57) ABSTRACT

A nonaqueous electrolyte for a secondary cell comprising a lithium salt, at least one hydrofluoroether having the following formula (2) and/or at least one hydrofluoroether having the following formula (3), and a non-fluorinated ether having the following formula (4):

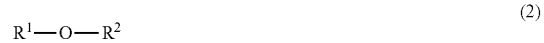

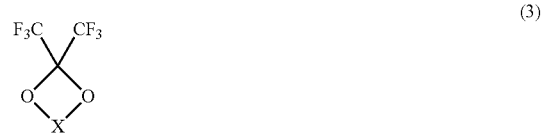

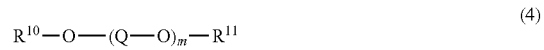

wherein $R^1$, $R^2$, X, $R^{10}$ and $R^{11}$ are as defined; and a secondary cell containing the nonaqueous electrolyte; and which nonaqueous electrolyte and secondary cell are free from erosion of electrodes or generation of carbon dioxide gas and which have a long-term non-flammability, an excellent low-temperature characteristic and a practically sufficient conductivity.

16 Claims, 1 Drawing Sheet

(56) References Cited

U.S. PATENT DOCUMENTS

| | | |
|---|---|---|
| 6,495,293 B1 | 12/2002 | Arai et al. |
| 2004/0038133 A1 | 2/2004 | Yamaguchi et al. |
| 2006/0228626 A1* | 10/2006 | Kawashima et al. ......... 429/200 |
| 2007/0054186 A1 | 3/2007 | Costello et al. |

FOREIGN PATENT DOCUMENTS

| | | |
|---|---|---|
| EP | 0 938 151 A3 | 8/1999 |
| EP | 1 039 570 A1 | 9/2000 |
| EP | 1 085 591 A1 | 3/2001 |
| JP | 08-037024 | 2/1996 |
| JP | 2000-294281 | 10/2000 |
| JP | 2001-93572 | 4/2001 |
| JP | 2001-210332 | 8/2001 |
| JP | 2001-256983 | 9/2001 |
| JP | 2001-273926 | 10/2001 |
| JP | 2004-87136 | 3/2004 |
| JP | 2004-234983 | 8/2004 |
| JP | 2006-049037 | 2/2006 |
| JP | 2006-318888 | 11/2006 |
| JP | 2008-021517 | 1/2008 |
| JP | 2008-218387 | 9/2008 |

OTHER PUBLICATIONS

Yuichi Kazue, et al., "Glyme—LiTSFI Complexes as Thermally Stable Electrolytes for Lithium Secondary Batteries", Summaries of Presentations at 47$^{th}$ Symposium on Batteries in 2006, 1F06. pp. 496-497.

Kazuki Yoshida, et al., "Glyme-lithium salt complexes as quasi ionic liquids for electrolytes of lithium secondary batteries", Summaries of Presentations at 75$^{th}$ Electrochemical Society of Japan in 2008, 3D09, p. 107.

Extended European Search Report issued Apr. 7, 2011, in Patent Application No. 09738836.7.

U.S. Appl. No. 13/341,269, filed Dec. 30, 2011, Iwaya.

U.S. Appl. No. 13/456,787, filed Apr. 26, 2012, Iwaya, et al.

* cited by examiner

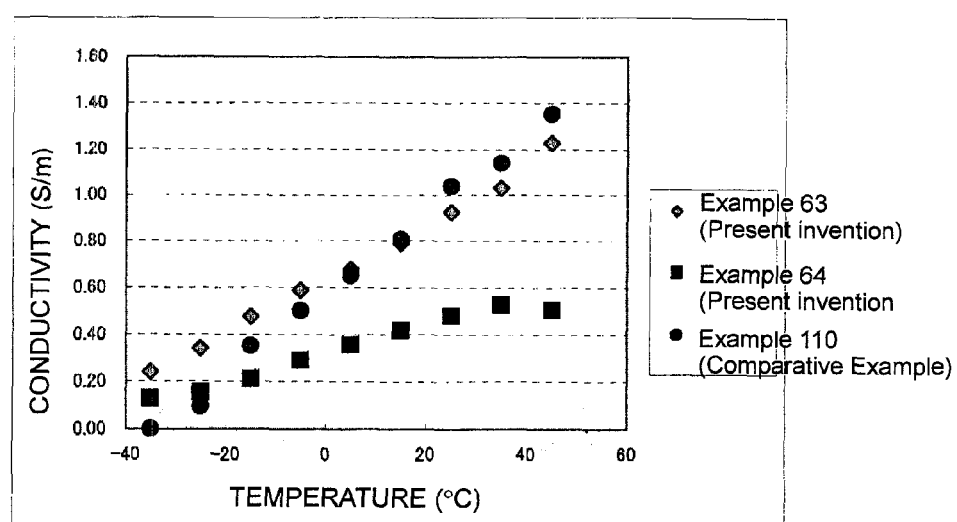

US 8,956,768 B2

NONAQUEOUS ELECTROLYTE COMPRISING ONE OR MORE HYDROFLUOROETHERS AND ONE OR MORE NON-FLUOROETHERS, AND A SECONDARY CELL CONTAINING THE NONAQUEOUS ELECTROLYTE

TECHNICAL FIELD

The present invention relates to a nonaqueous electrolyte for a secondary cell, and a secondary cell using such an electrolyte.

BACKGROUND ART

In a nonaqueous electrolyte for a secondary cell, a lithium salt is usually well dissolved to provide a high lithium ion conductivity, and a carbonate type compound has been widely used as a solvent from such a viewpoint that it has a wide potential window. However, a carbonate type compound usually has a low flash point and is easily flammable at the time of e.g. runaway of a cell, and therefore, it has a serious problem from the aspect of safety. To overcome such a problem, many nonaqueous electrolytes have been proposed in which a lithium salt having a chain structure such as $LiPF_6$ or $Li[N(SO_2C_2F_5)_2]$, a carbonate type solvent and a hydrofluoroether having no flash point, are used in combination.

As such a hydrofluoroether, a monoether of an alkyl group and a fluoroalkyl group (a fluoroalkyl group is a group having at least one hydrogen atom in an alkyl group substituted by a fluorine atom), or a specific polyfluoroether having a chain structure and having at least two etheric oxygen atoms, is known.

A nonaqueous electrolyte containing such a hydrofluoroether is, in its initial composition, not ignited even when contacted with an ignition source. The reason is such that a low boiling point hydrofluoroether having no flash point is filled in the vapor phase to provide so-called choking effect. However, with a conventional nonaqueous electrolyte containing a hydrofluoroether, if an excessive load is exerted to the cell, and a high temperature condition is prolonged, such a hydrofluoroether volatilizes to lose the choking effect, whereby it has been sometimes difficult to warrant nonflammability.

Therefore, the following nonaqueous electrolytes have been proposed as nonaqueous electrolytes to warrant nonflammability more securely.

A nonaqueous electrolyte for a lithium secondary cell comprising $LiPF_6$ and an organic fluorinated ether compound represented by $R^7$—O—$R^8$ (wherein $R^7$ and $R^8$ are fluorinated alkyl groups) (Patent Document 1).

A nonaqueous electrolyte comprising $LiN(CF_3SO_2)_2$ and, as a solvent, a glyme type solvent (Patent Document 2):

A nonaqueous electrolyte comprising $LiBF_4$ and, as a solvent, tetraglyme (Patent Document 3), On the other hand, it has been reported that lithium salts such as $CF_3SO_2N(Li)SO_2CF_3$ and $FSO_2N(Li)SO_2F$ form a strong interaction with etheric oxygen of the glyme type solvent to form a stable 1:1 complex, and from the results of e.g. the thermal analysis, such a complex exhibits a behavior as if it were a single ion species and was not ignitable at all by heating by a burner (Non-Patent Documents 1 and 2).

Further, a nonaqueous electrolyte is disclosed which comprises a glyme type solvent, an alkyl(fluoroalkyl)ether represented by $C_aF_bOR^9$ (wherein $R^9$ is an alkyl group, a is an integer of from 1 to 10, and b is 2a+1), a cyclic carbonate and a lithium salt represented by $LiN(SO_2(CF_2)_cF)_2$ (wherein c is an integer of from 1 to 5) (Patent Document 4).

PRIOR ART DOCUMENTS

Patent Documents

Patent Document 1: JP-A-2004-87136
Patent Document 2: JP-A-2004-234983
Patent Document 3: JP-A-2001-273926
Patent Document 4: JP-A-2001-93572

Non-Patent Documents

Non-Patent Document 1: Summaries of Presentations at 47th Symposium on Batteries in 2006 1F06
Non-Patent Document 2: Summaries of Presentations at 75th Electrochemical Society of Japan in 2008 3D09

DISCLOSURE OF THE INVENTION

Problems to be Solved by the Invention

However, since the solubility of $LiPF_6$ in an organic fluorinated ether compound is usually low, the nonaqueous electrolyte of Patent Document 1 actually contained, as a compatibilizing agent, $HCF_2CF_2CH_2OCH_2CH_2OCH_3$, $HCF_2(CF_2)_3CH_2OCH_2CH_2OCH_3$, $CH_3COOCH_2(CF_2)_3CF_2H$, $CH_3COOCH_2CF_2CF_2H$, etc. Further, since no adequate solubility of $LiPF_6$ was obtainable by such a compatibilizing agent only, at least 30 vol % of a cyclic carbonate was added as an additive in the nonaqueous electrolyte. If such a large amount of a cyclic carbonate is added, it is considered difficult to maintain nonflammability of the nonaqueous electrolyte for a long period of time. Further, by decomposition of the cyclic carbonate, it is likely to lead to generation of a large amount of carbon dioxide gas.

Further, as represented by ethylene carbonate having a melting point of 36° C., the cyclic carbonate compound usually has a high melting point, and accordingly, it is known that if it is added in a large amount, the conductivity at a low temperature of at most room temperature tends to be inadequate.

The nonaqueous electrolytes of Patent Documents 2 and 3 did not have nonflammability of practically useful level.

The 1:1 complex of the lithium salt and the glyme type solvent as disclosed in Non-Patent Documents 1 and 2 was actually evaluated in the form of a nonaqueous electrolyte by the present inventor, whereby it was found to have a high viscosity and low conductivity, such being not practically useful.

Accordingly, it is an object of the present invention to provide a nonaqueous electrolyte for a secondary cell which is free from erosion of electrodes or generation of carbon dioxide gas and which has a long-term nonflammability and a practically sufficient conductivity at the same time. Further, it is another object of the present invention to provide a secondary cell which is free from erosion of electrodes and generation of carbon dioxide gas and which has a long-term nonflammability and a practically sufficient conductivity at the same time.

Means to Solve the Problems

The nonaqueous electrolyte for a secondary cell of the present invention is a nonaqueous electrolyte for a secondary cell, which comprises a lithium salt, at least one hydrofluoroether selected from the group consisting of a compound represented by the following formula (2) and a compound represented by the following formula (3), and at least one compound represented by the following formula (4):

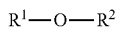 (2)

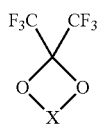 (3)

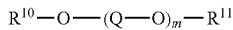 (4)

wherein each of $R^1$ and $R^2$ which are independent of each other, is a $C_{1-10}$ alkyl group, a $C_{1-10}$ fluorinated alkyl group, a $C_{1-10}$ alkyl group having an etheric oxygen atom between a carbon atom and a carbon atom, or a $C_{1-10}$ fluorinated alkyl group having an etheric oxygen atom between a carbon atom and a carbon atom, provided that one or each of $R^1$ and $R^2$ is a partially fluorinated group; X is a $C_{1-5}$ alkylene group, a $C_{1-5}$ partially fluorinated alkylene group, a $C_{1-5}$ alkylene group having an etheric oxygen atom between a carbon atom and a carbon atom, or a $C_{1-5}$ partially fluorinated alkylene group having an etheric oxygen atom between a carbon atom and a carbon atom; m is an integer of from 1 to 10; Q is a $C_{1-4}$ alkylene group, or a group having at least one of hydrogen atoms of such an alkylene group substituted by a $C_{1-5}$ alkyl group or a $C_{1-5}$ alkyl group having an etheric oxygen atom between a carbon atom and a carbon atom, provided that when m is 2 or more, plural Q may be the same groups or different groups; and each of $R^{10}$ and $R^{11}$ which are independent of each other, is a $C_{1-5}$ alkyl group, or $R^{10}$ and $R^{11}$ are linked to each other to form a $C_{1-10}$ alkylene group.

In the nonaqueous electrolyte for a secondary cell of the present invention, the lithium salt is preferably at least one member selected from the group consisting of $LiPF_6$ and a compound represented by the following formula (1):

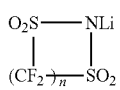 (1)

wherein n is an integer of from 1 to 5.

The compound represented by the above formula (4) is preferably a compound represented by the following formula (4A):

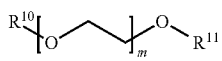 (4A)

wherein m is an integer of from 1 to 10.

The above lithium salt is preferably a compound represented by the above formula (1) wherein n is 2.

The above hydrofluoroether is preferably at least one member selected from the group consisting of $CF_3CH_2OCF_2CF_2H$, $CHF_2CF_2CH_2OCF_2CF_2H$, $CF_3CF_2CH_2OCF_2CF_2H$ and $CF_3CH_2OCF_2CHFCF_3$.

The hydrofluoroether is preferably a compound represented by the above formula (3) wherein X is one member selected from the group consisting of $CH_2$, $CH_2CH_2$, $CH(CH_3)CH_2$ and $CH_2CH_2CH_2$.

Further, the above ether is preferably a compound represented by the above formula (4) wherein m is from 2 to 6.

Further, the content of the compound represented by the above formula (4) is preferably from 0.2 to 4.0 times by mol, to the total amount of the lithium salt.

Further, the electrolyte preferably further contains at least one compound (5) selected from the group consisting of a compound represented by the following formula (5-1), a compound represented by the following formula (5-2) and a compound represented by the following formula (5-3):

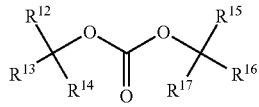 (5-1)

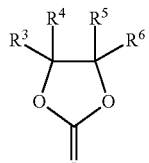 (5-2)

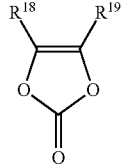 (5-3)

wherein each of $R^3$ to $R^6$ and $R^{12}$ to $R^{19}$ which are independent of one another, is a hydrogen atom, a halogen atom, an alkyl group or a halogenated alkyl group.

The content of the compound (5) is preferably at most 10 vol % based on the total volume of the electrolyte.

The content of the compound (5) is preferably from 0.1 to 0.45 vol % based on the total volume of the electrolyte.

The conductivity at 25° C. is preferably at least 0.25 S·m$^{-1}$.

The secondary cell of the present invention is preferably a secondary cell comprising a negative electrode made of a material capable of storing or discharging lithium ions electrochemically, or metal lithium or a lithium alloy, a positive electrode made of a material capable of storing or discharging lithium ions electrochemically, and a nonaqueous electrolyte for a secondary cell as defined in any one of the above.

Further, the secondary cell of the present invention is preferably used at a charging voltage of at least 3.4 V (a potential based on lithium metal; hereinafter, a voltage is all represented by a potential based on lithium metal).

The nonaqueous electrolyte of the present invention is a nonaqueous electrolyte, which comprises a lithium salt, at least one hydrofluoroether selected from the group consisting of a compound represented by the following formula (2) and a compound represented by the following formula (3), and at least one compound represented by the following formula (4):

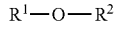 (2)

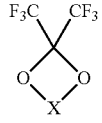 (3)

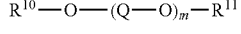 (4)

wherein each of $R^1$ and $R^2$ which are independent of each other, is a $C_{1-10}$ alkyl group, a $C_{1-10}$ fluorinated alkyl group, a $C_{1-10}$ alkyl group having an etheric oxygen atom between a carbon atom and a carbon atom, or a $C_{1-10}$ fluorinated alkyl group having an etheric oxygen atom between a carbon atom and a carbon atom, provided that one or each of $R^1$ and $R^2$ is a partially fluorinated group; X is a $C_{1-5}$ alkylene group, a $C_{1-5}$ partially fluorinated alkylene group, a $C_{1-5}$ alkylene group having an etheric oxygen atom between a carbon atom and a carbon atom, or a $C_{1-5}$ partially fluorinated alkylene group having an etheric oxygen atom between a carbon atom and a carbon atom; m is an integer of from 1 to 10; Q is a $C_{1-4}$ alkylene group, or a group having at least one of hydrogen atoms of such an alkylene group substituted by a $C_{1-5}$ alkyl group or a $C_{1-5}$ alkyl group having an etheric oxygen atom between a carbon atom and a carbon atom, provided that when m is 2 or more, plural Q may be the same groups or different groups; and each of $R^{10}$ and $R^{11}$ which are independent of each other, is a $C_{1-5}$ alkyl group, or $R^{10}$ and $R^{11}$ are linked to each other to form a $C_{1-10}$ alkylene group.

Advantageous Effects of the Invention

The nonaqueous electrolyte for a secondary cell of the present invention is capable of reducing erosion of an aluminum current collector. Further, use of a cyclic carbonate compound can be minimized thereby to avoid generation of carbon dioxide gas. Further, it is excellent in the low temperature characteristic and has a long term nonflammability and a practically sufficient conductivity at the same time.

The secondary cell of the present invention is capable of reducing erosion of an aluminum current collector by using the above nonaqueous electrolyte for a secondary cell. Further, it is free from generation of carbon dioxide gas. Further, it has a long term nonflammability and a practically sufficient conductivity at the same time.

BRIEF DESCRIPTION OF THE DRAWING

FIG. 1 is a graph showing the changes in conductivity at from −35° C. to +45° C. of the nonaqueous electrolyte of the present invention and the nonaqueous electrolyte of Comparative Example.

MODE FOR CARRYING OUT THE INVENTION

[Nonaqueous Electrolyte for Secondary Cell]

The nonaqueous electrolyte for a secondary cell of the present invention (hereinafter referred to simply as the nonaqueous electrolyte) is an electrolyte comprising a lithium salt, a hydrofluoroether and an ether compound. The nonaqueous electrolyte is an electrolyte using a solvent which contains substantially no water, and an electrolyte wherein, even when it contains water, the water content is an amount within a range where no deterioration is observed in the performance of a secondary cell using such a nonaqueous electrolyte. The amount of water which may be contained in such a nonaqueous electrolyte is preferably at most 500 ppm by weight, more preferably at most 100 ppm by weight, particularly preferably at most 50 ppm by weight, based on the total weight of the electrolyte. The lower limit of the water content is 0 ppm.

(Lithium Salt)

The lithium salt in the present invention is an electrolyte which dissociates in the nonaqueous electrolyte to supply lithium ions. Such a lithium salt may be at least one member selected from the group consisting of $LiPF_6$, a compound represented by the following formula (1) (hereinafter referred to as a compound (1)), $FSO_2N(Li)SO_2F$, $LiClO_4$ and $LiBF_4$. Such a lithium salt is preferably at least one member selected from the group consisting of $LiPF_6$ and the compound (1).

That is, use of $LiPF_6$ alone, use of at least one compound (1), or combined use of $LiPF_6$ and the compound (1) is preferred.

Further, as an example for combined use with another lithium salt, combined use of $LiPF_6$ and $FSO_2N(Li)SO_2F$; $LiPF_6$, the compound (1) and $FSO_2N(Li)SO_2F$; or $LiClO_4$ and at least one member selected from the group consisting of the compound (1) and $FSO_2N(Li)SO_2F$; or combined use of $LiBF_4$ and at least one member selected from the group consisting of the compound (1) and $FSO_2N(Li)SO_2F$, may be mentioned.

In the compound (1), n is an integer of from 1 to 5. The compound (1) may be the following compound (1-1), (1-2), (1-4) or (1-5). Further, a compound (1-3) may be mentioned as another example for a preferred lithium salt of a cyclic imide.

Among them, the compound (1-2) wherein n is 2 is preferred, whereby a nonaqueous electrolyte having a high conductivity can easily be obtainable.

The content of the lithium salt in the nonaqueous electrolyte is preferably from 0.1 to 3.0 mmol/L, particularly preferably from 0.5 to 2.0 mol/L. When the content of the lithium salt is at least 0.1 mol/L, a nonaqueous electrolyte having a high conductivity tends to be easily obtainable. On the other hand, when the content of the lithium salt is at most 3.0 mol/L, the lithium salt can easily be dissolved in the hydrofluoroether.

Further, in a case where both $LiPF_6$ and the compound (1) are used, the molar ratio (Mb/Ma) of the molar amount (Mb)

of the compound (1) to the molar amount (Ma) of LiPF$_6$ is preferably from 0.01 to 10, more preferably from 0.05 to 2.0.

When the above molar ratio (Mb/Ma) is at least 0.01, the conductivity of the nonflammable nonaqueous electrolyte can easily be maintained to be high. On the other hand, when the above molar ratio (Mb/Ma) is at most 10, a nonaqueous electrolyte having a high chemical stability can easily be obtainable.

Further, in a case where LiPF$_6$ and FSO$_2$N(Li)SO$_2$F are used, the molar ratio (Mc/Ma) of the molar amount (Mc) of FSO$_2$N(Li)SO$_2$F to the molar amount (Ma) of LiPF$_6$ is preferably from 0.01 to 10, more preferably from 0.05 to 2.0.

When the above molar ratio (Mc/Ma) is at least 0.01, the conductivity of the nonflammable nonaqueous electrolyte can be easily maintained to be high. On the other hand, if the above molar ratio (Mc/Ma) is at most 10, a nonaqueous electrolyte having a high chemical stability can easily be obtainable.

(Hydrofluoroether)

The hydrofluoroether is a solvent to impart nonflammability to the nonaqueous electrolyte. The hydrofluoroether of the present invention is at least one member selected from the group consisting of a compound represented by the following formula (2) (hereinafter referred to as a compound (2)) and a compound represented by the following formula (3) (hereinafter referred to as a compound (3)):

$$R^1-O-R^2 \quad (2)$$

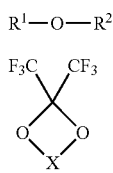
(3)

In the compound (2), each of R$^1$ and R$^2$ which are independent of each other, is a C$_{1-10}$ alkyl group, a C$_{1-10}$ fluorinated alkyl group, a C$_{1-10}$ alkyl group having an etheric oxygen atom between a carbon atom and a carbon atom, or a C$_{1-10}$ fluorinated alkyl group having an etheric oxygen atom between a carbon atom and a carbon atom, provided that one or each of R$^1$ and R$^2$ is a partially fluorinated above group. R$^1$ and R$^2$ may be the same or different. In this specification, a fluorinated alkyl group is a group having some or all of hydrogen atoms in an alkyl group substituted by fluorine atoms. A partially fluorinated group is a group having some of hydrogen atoms in an alkyl group or an alkyl group having an etheric oxygen atom between a carbon atom and a carbon atom, substituted by fluorine atoms. In the partially fluorinated group, a hydrogen atom is present. Further, in the present invention, the structure of each of the alkyl group and the alkyl group having an etheric oxygen atom between a carbon atom and a carbon atom may, for example, be a straight chain structure, a branched structure, a cyclic structure or a group having a partially cyclic structure (such as a cycloalkyl alkyl group).

The compound (2) is preferably a compound (2-A) wherein each of R$^1$ and R$^2$ is a C$_{1-10}$ partially fluorinated alkyl group, or a compound (2-B) wherein R$^1$ is a C$_{1-10}$ partially fluorinated alkyl group having an etheric oxygen atom between a carbon atom and a carbon atom, and R$^2$ is a C$_{1-10}$ partially fluorinated alkyl group or a C$_{1-10}$ partially fluorinated alkyl group having an etheric oxygen atom between a carbon atom and a carbon atom.

When one or each of R$^1$ and R$^2$ is a partially fluorinated alkyl group, the solubility of the lithium salt in the nonaqueous electrolyte is improved.

With the compound (2), if the number of carbon atoms is too small, the boiling point tends to be too low, and if it is too large, the viscosity tends to be high. Accordingly, the compound having a total number of carbon atoms being from 4 to 10 is preferred, and the compound having a total number of carbon atoms being from 4 to 8, is particularly preferred. The molecular weight of the compound (2) is preferably from 150 to 800, more preferably from 150 to 500, particularly preferably from 200 to 500. The number of etheric oxygen atoms in the compound (2) is influential over the flammability. Therefore, in the case of a compound (2) having etheric oxygen atoms, the number of etheric oxygen atoms is preferably from 1 to 4, particularly preferably 1 or 2. Further, as the fluorine content in the compound (2) becomes high, the nonflammability will be improved, and the proportion of the molecular weight of fluorine atoms to the molecular weight of the compound (2) is preferably at least 50%, particularly preferably at least 60%.

Specific examples of the compound (2-1) may, for example, be the following formulae (2-A1) to (2-A100).

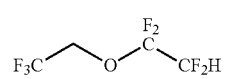
(2-A1)

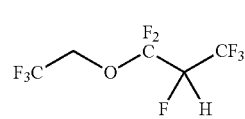
(2-A2)

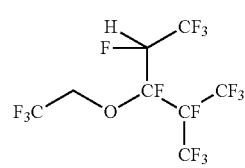
(2-A3)

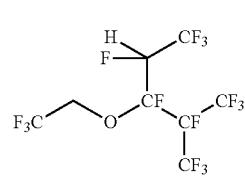
(2-A4)

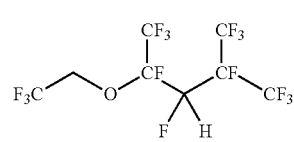
(2-A5)

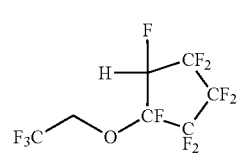
(2-A6)

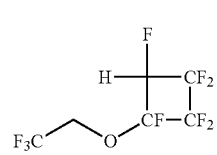
(2-A7)

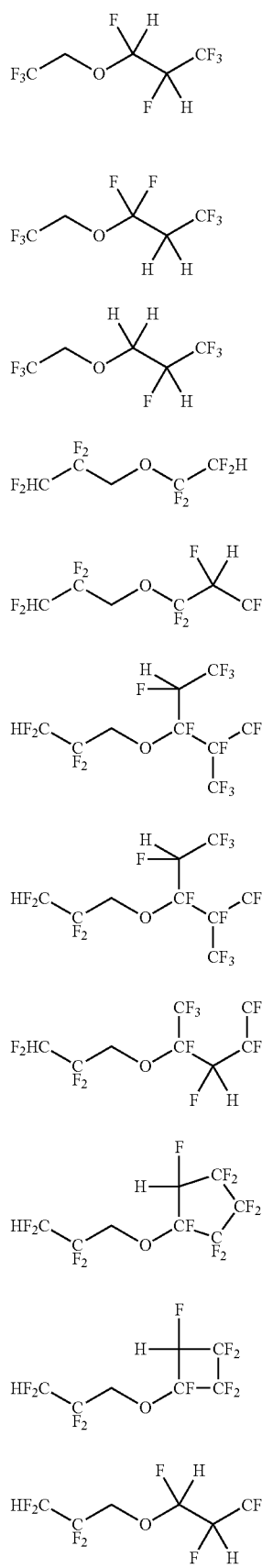
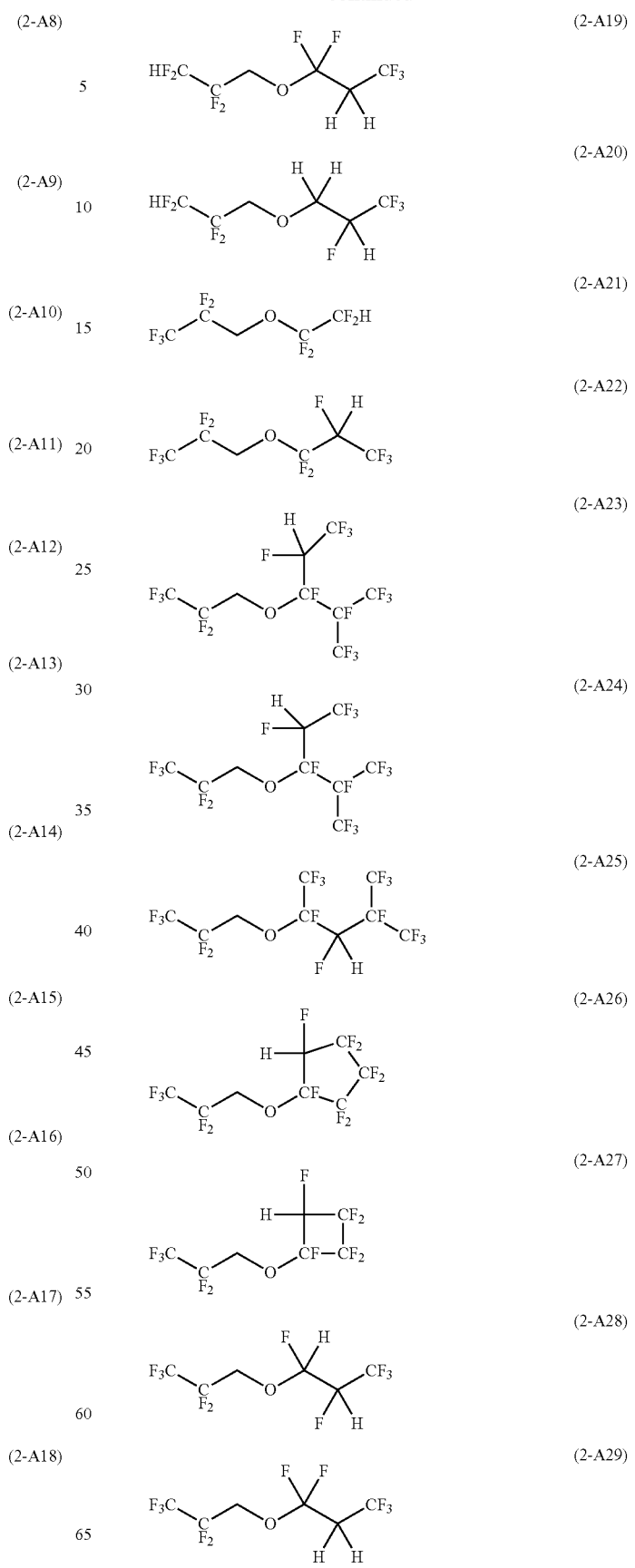

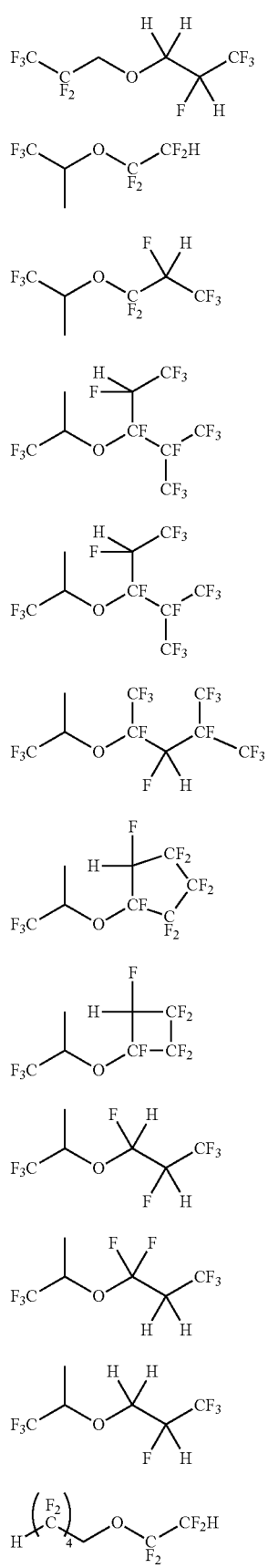

-continued

-continued
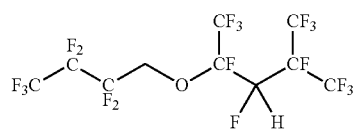 (2-A75)
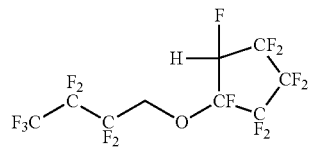 (2-A76)
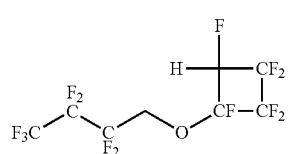 (2-A77)
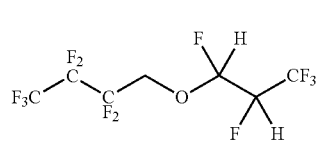 (2-A78)
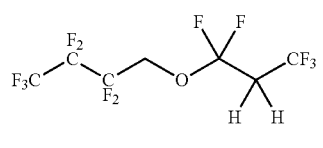 (2-A79)
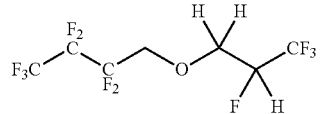 (2-A80)
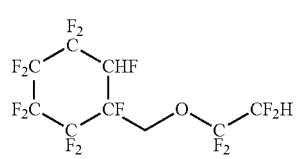 (2-A81)
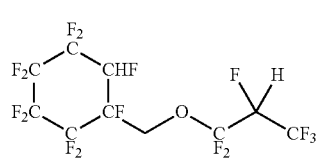 (2-A82)
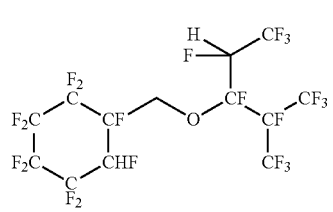 (2-A83)
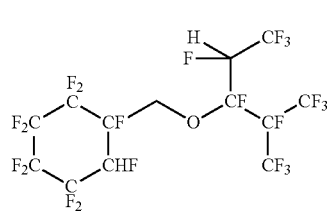 (2-A84)
-continued
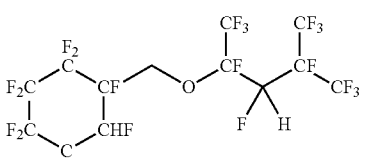 (2-A85)
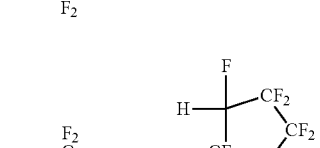 (2-A86)
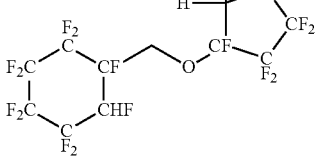 (2-A87)
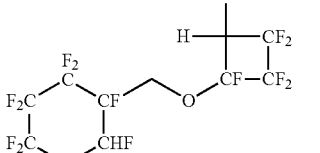 (2-A88)
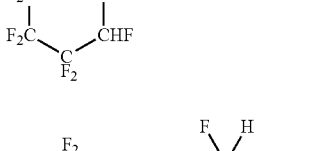 (2-A89)
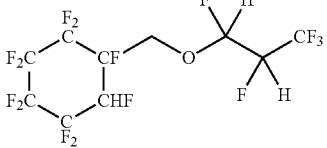 (2-A90)
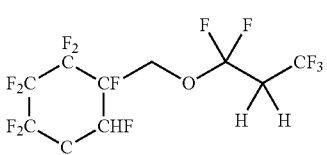 (2-A91)
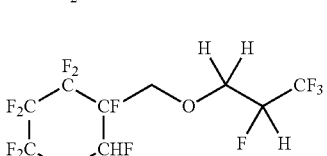 (2-A92)
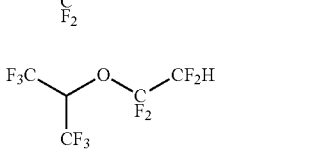 (2-A93)
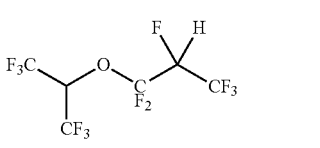
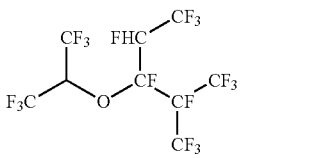

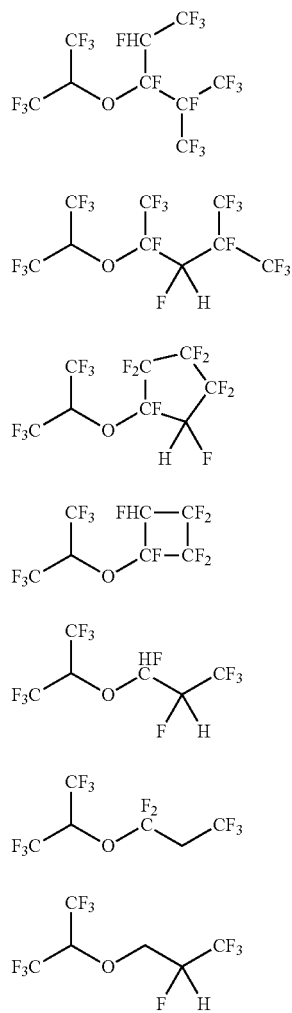
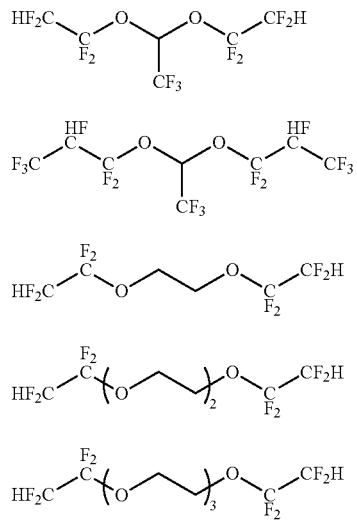
Specific examples of the compound (2-B) may, for example, be the following formulae (2-B1) to (2-B8).
Other specific examples of the compound (2) may, for example, be the compounds represented by the following formulae.
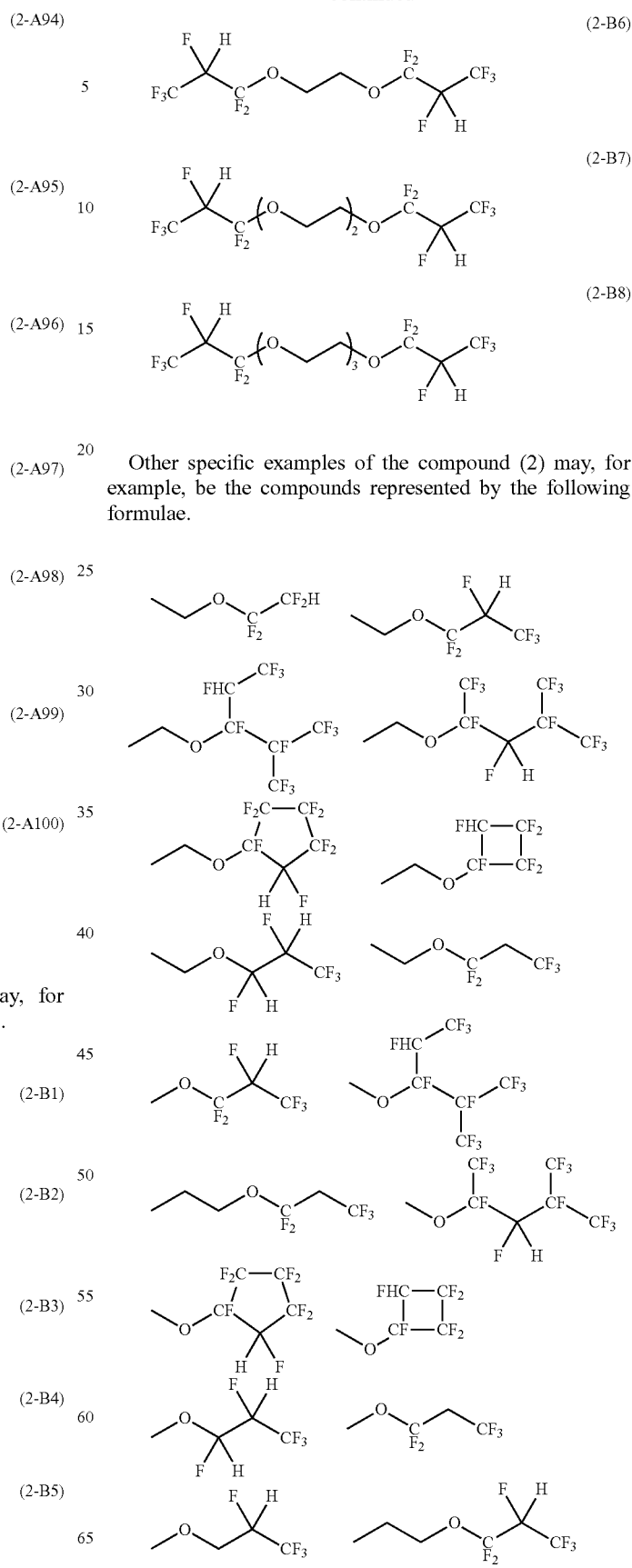

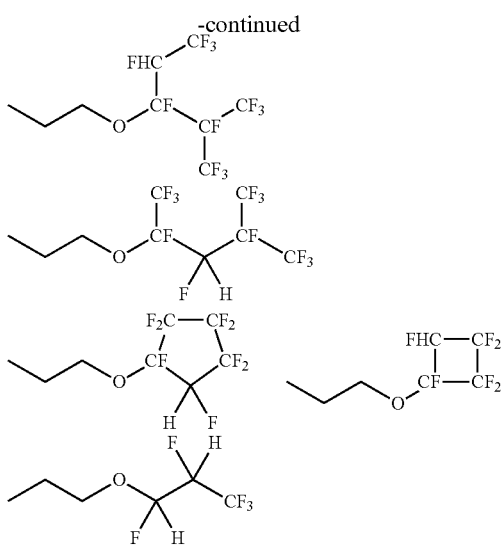

Since the lithium salt can thereby be uniformly dissolved to easily obtain a nonaqueous electrolyte having excellent non-flammability and a high conductivity, the compound (2) is preferably a compound (2-A) wherein each of $R^1$ and $R^2$ is a $C_{1-10}$ partially fluorinated alkyl group, more preferably $CF_3CH_2OCF_2CF_2H$ (compound (2-A1)) (tradename: AE-3000, manufactured by Asahi Glass Company, Limited), $CHF_2CF_2CH_2OCF_2CF_2H$ (compound (2-A11)), $CF_3CF_2CH_2OCF_2CF_2H$ (compound (2-A21)) or $CF_3CH_2OCF_2CHFCF_3$ (compound (2-A2)), particularly preferably the compound (2-A1).

In the compound (3), X is any one of four modes i.e. a $C_{1-5}$ alkylene group, a $C_{1-5}$ partially fluorinated alkylene group, a $C_{1-5}$ alkylene group having an etheric oxygen atom between a carbon atom and a carbon atom, or a $C_{1-5}$ partially fluorinated alkylene group having an etheric oxygen atom between a carbon atom and a carbon atom. The partially fluorinated alkylene group is a group having some of hydrogen atoms in an alkylene group substituted by fluorine atoms.

Since the lithium salt can be uniformly dissolved, and a nonaqueous electrolyte having excellent nonflammability and a high conductivity can easily be obtained, the compound (3) is preferably a hydrofluoroether having the above formula (3) wherein X is one member selected from the group consisting of $CH_2$, $CH_2CH_2$, $CH(CH_3)CH_2$ and $CH_2CH_2CH_2$.

Specific examples of the compound (3) may be the following compounds.

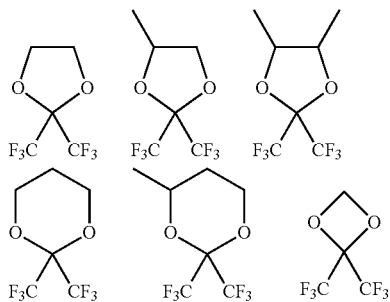

The content of the hydrofluoroether in the nonaqueous electrolyte is preferably from 20 to 95 vol %, particularly preferably from 50 to 90 vol %, based on 100 vol % of the total amount of solvents used for the nonaqueous electrolyte.

Further, in a case where the compound (2) (volume: Va) and the compound (3) (volume: Vb) are used in combination as the hydrofluoroether, their volume ratio (Vb/Va) is preferably from 0.01 to 100, more preferably from 0.1 to 10.

(Ether Compound)

In the present invention, the ether compound is a solvent which plays a role to uniformly dissolve the lithium salt in the above hydrofluoroether by being efficiently solvated with the lithium salt. The ether compound is considered such that its part or whole forms a complex with the lithium salt in the electrolyte. The ether compound may, for example, be a compound represented by the following formula (4) (hereinafter referred to as a compound (4)):

wherein m is an integer of from 1 to 10, Q is a $C_{1-4}$ alkylene group, or a group having at least one hydrogen atom in such an alkylene group substituted by a $C_{1-5}$ alkyl group or a $C_{1-5}$ alkyl group having an etheric oxygen atom between a carbon atom and a carbon atom, provided that when m is 2 or more, plural Q may be the same groups or different groups, and each of $R^{10}$ and $R^{11}$ which are independent of each other, is a $C_{1-5}$ alkyl group, or $R^{10}$ and $R^{11}$ are linked to form a $C_{1-10}$ alkylene group.

In the compound (4), m is preferably from 1 to 6, more preferably from 2 to 5, particularly preferably from 2 to 4. Q is preferably a linear alkylene group, particularly preferably —$CH_2CH_2$—. Each of $R^{10}$ and $R^{11}$ is preferably a methyl group or an ethyl group, particularly preferably a methyl group. Q is preferably a compound represented by the following formula (4A).

In the compound (4), a compound wherein each of $R^{10}$ and $R^{11}$ is a methyl group, Q is —$CH_2CH_2$— and m is from 1 to 6, may, for example, be 1,2-dimethoxyethane (m=1, monoglyme), diglyme (m=2), triglyme (m=3), tetraglyme (m=4), pentaglyme (m=5) or hexaglyme (m=6).

Other compounds included in the compound (4) may, for example, be 1,2-diethoxyethane, diethylene glycol diethyl ether, diethylene glycol di-n-propyl ether, diethylene glycol di-iso-propyl ether, diethylene glycol di-n-butyl ether, triethylene glycol diethyl ether, triethylene glycol di-n-propyl ether, triethylene glycol di-iso-propyl ether, triethylene glycol di-n-butyl ether, tetraethylene glycol diethyl ether, tetraethylene glycol di-n-propyl ether, tetraethylene glycol di-iso-propyl ether, tetraethylene glycol di-n-butyl ether, pentaethylene glycol diethyl ether, pentaethylene glycol di-n-propyl ether, pentaethylene glycol di-iso-propyl ether, pentaethylene glycol di-n-butyl ether, hexaethylene glycol diethyl ether, hexaethylene glycol di-n-propyl ether, hexaethylene glycol di-iso-propyl ether and hexaethylene glycol di-n-butyl ether.

In the compound (4), a compound wherein each of $R^{10}$ and $R^{11}$ is a methyl group or an ethyl group, Q may be a group other than —$CH_2CH_2$— and m is from 1 to 6, may include, for example, compounds represented by the following formulae. Here, Et represents an ethyl group.

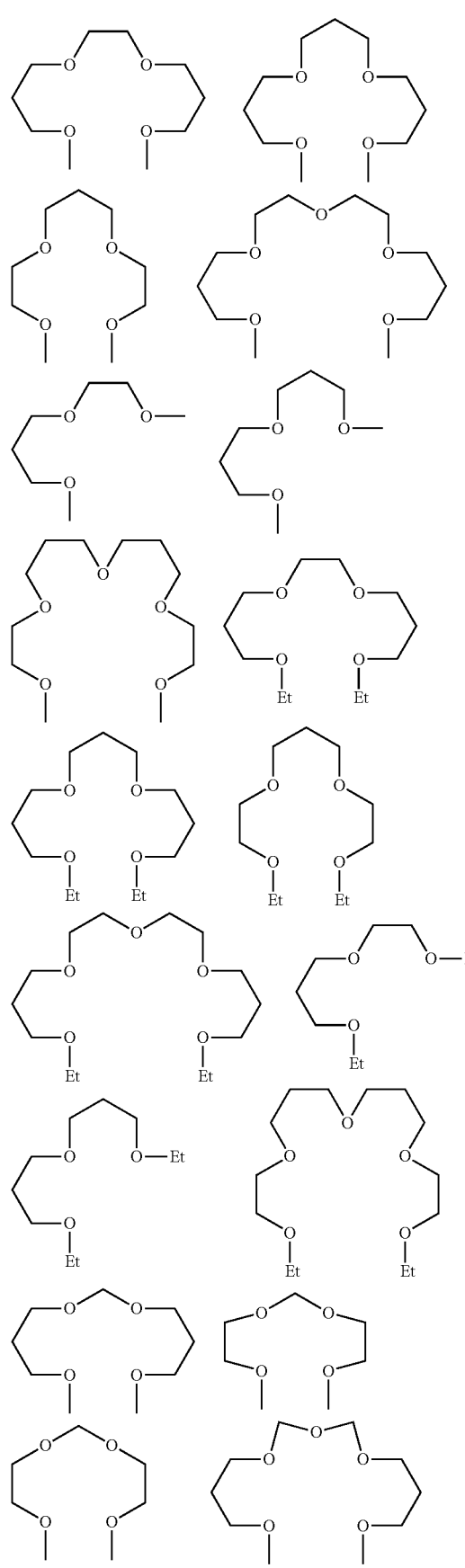
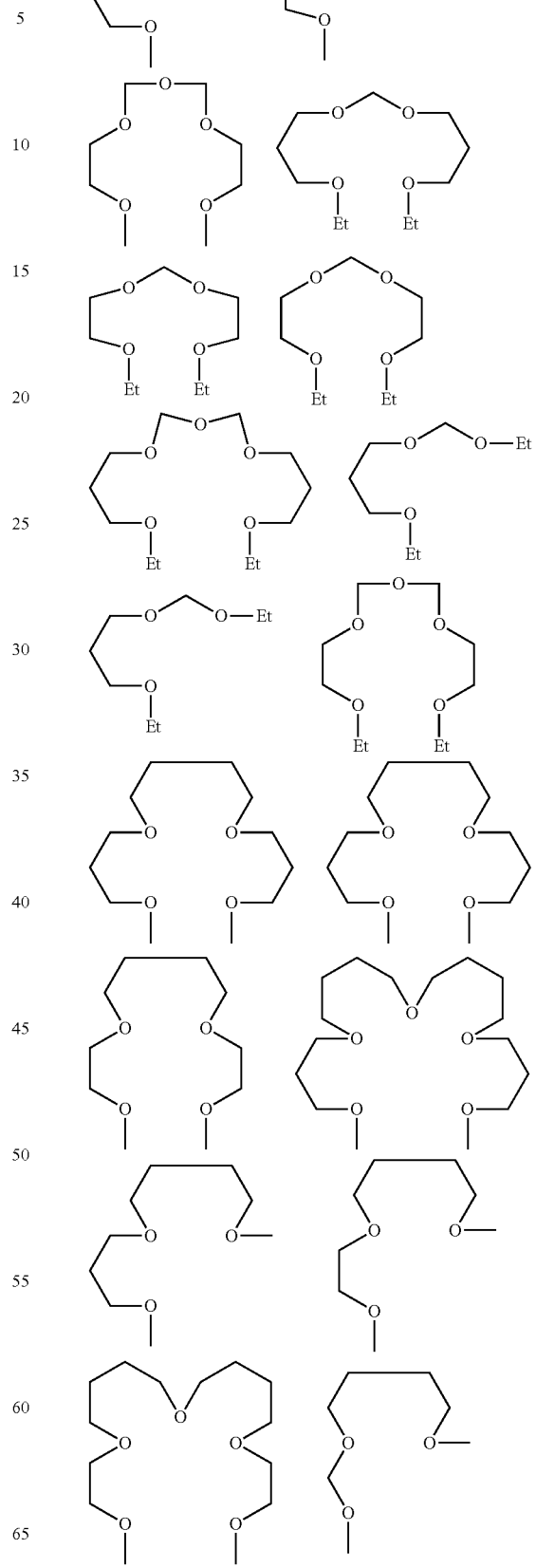

-continued

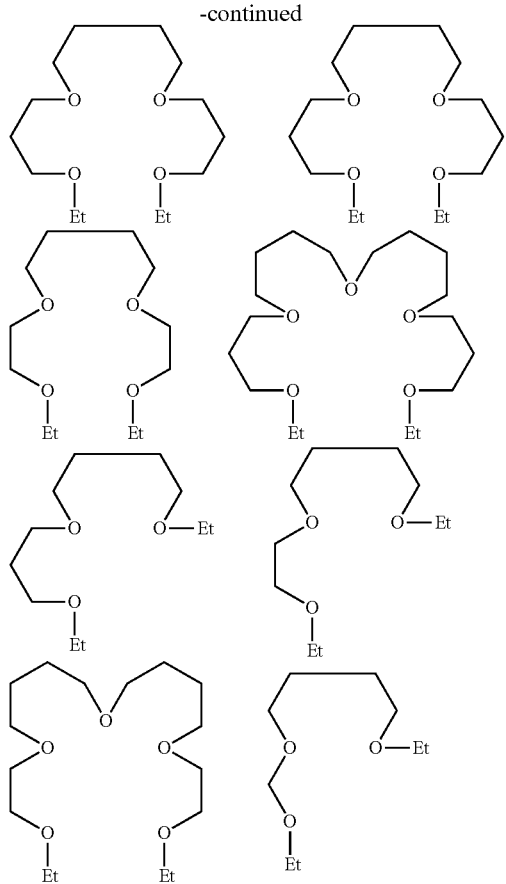

The compound (4) is preferably monoglyme, diglyme, triglyme, tetraglyme, pentaglyme, hexaglyme, diethylene glycol diethyl ether, triethylene glycol diethyl ether, tetraethylene glycol diethyl ether, pentaethylene glycol diethyl ether or hexaethylene glycol diethyl ether, more preferably monoglyme, diglyme, triglyme, tetraglyme, pentaglyme or hexaglyme.

Further, from such a viewpoint that when the viscosity (20° C.) is at most 5 cP, the nonaqueous electrolyte shows an excellent practical solvent viscosity and the obtainable nonaqueous electrolyte exhibits a good conductivity, it is preferably diglyme, triglyme, tetraglyme, pentaglyme, diethylene glycol diethyl ether, triethylene glycol diethyl ether, tetraethylene glycol diethyl ether or pentaethylene glycol diethyl ether wherein m is from 2 to 5, and from such a viewpoint that balance of both properties of the viscosity and the flash point is excellent, it is particularly preferably diglyme (flash point: 50° C.), triglyme (flash point; 110° C.) or tetraglyme (flash point: 144° C.).

Further, the compound (4) wherein $R^{10}$ and $R^{11}$ are linked to form a $C_{1-10}$ alkylene group, may, for example, be 12-crown-4, 14-crown-4, 15-crown-5 or 18-crown-6.

The compound (4) preferably essentially contains a compound of the above formula (4) wherein m is from 2 to 6, more preferably consists solely of the compound of the above formula (4) wherein m is from 2 to 6, further preferably consists solely of one type selected from the group consisting of compounds of the above formula (4) wherein m is from 2 to 6, particularly preferably consists solely of diglyme, triglyme or tetraglyme.

The content of the compound (4) in the nonaqueous electrolyte is preferably from 0.2 to 4.0 times by mol, more preferably from 0.5 to 3.0 times by mol, particularly preferably from 0.5 to 2.0 times by mol, to the total amount of the lithium salt in the nonaqueous electrolyte.

When the compound (4) is at least 0.2 times by mol to the lithium salt, the lithium salt can easily be uniformly dissolved in the hydrofluoroether. On the other hand, when the compound (4) is at most 4.0 times by mol to the lithium salt, a nonaqueous electrolyte excellent in nonflammability can easily be obtained.

(Carbonate)

Further, in Addition to the Above-Described Lithium Salt, Hydrofluoroether and ether compound, the nonaqueous electrolyte of the present invention may contain at least one compound (5) selected from the group consisting of a compound represented by the following formula (5-1) (hereinafter referred to as a compound (5-1)), and as cyclic carbonates, a compound represented by the following formula (5-2) (hereinafter referred to as a compound (5-2)) and a compound represented by the following formula (5-3) (hereinafter referred to as a compound (5-3)). In a case where the compound (5) is contained, it is preferred that the compound (5-3) is contained as the compound (5).

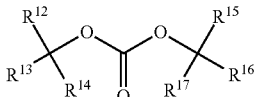 (5-1)

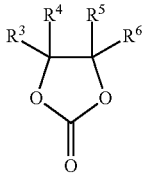 (5-2)

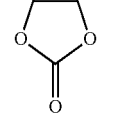 (5-3)

In the compound (5-1), each of $R^{12}$ to $R^{17}$ which are independent of one another, is a hydrogen atom, a halogen atom, an alkyl group or a halogenated alkyl group.

The compound (5-1) is preferably at least one compound selected from the group consisting of dimethyl carbonate, diethyl carbonate, methylethyl carbonate, di-n-propyl carbonate, methyl-n-propyl carbonate, ethyl-n-propyl carbonate, methylisopropyl carbonate, ethyl-n-propyl carbonate, ethylisopropyl carbonate, di-n-propyl carbonate, diisopropyl carbonate and 3-fluoropropylmethyl carbonate, and from the viewpoint of availability and physical properties influential over the performance of the electrolyte such as the viscosity, it is particularly preferably dimethyl carbonate, diethyl carbonate or methylethyl carbonate.

In the compound (5-2), each of $R^3$ to $R^6$ which are independent of one another, is a hydrogen atom, a halogen atom, an alkyl group or a halogenated alkyl group.

The compound (5-2) is preferably at least one cyclic carbonate selected from the group consisting of propylene carbonate, ethylene carbonate, butylene carbonate, 4-chloro-1,3-dioxolan-2-one, 4-fluoro-1,3-dioxolan-2-one and 4-trifluoromethyl-1,3-dioxolan-2-one, and from the viewpoint of availability and the nature of the electrolyte, it is particularly preferably ethylene carbonate, propylene carbonate or fluoroethylene carbonate.

In the compound (5-3), each of $R^{18}$ and $R^{19}$ which are independent of each other, is a hydrogen atom, a halogen atom, an alkyl group or a halogenated alkyl group.

The compound (5-3) is preferably dimethylvinylene carbonate or vinylene carbonate, particularly preferably vinylene carbonate.

By the addition of the compound (5), the solubility of the above lithium salt in the hydrofluoroether will be improved.

Further, when charging is carried out by a secondary cell using a nonaqueous electrolyte containing the compound (5), the compound (5) will be decomposed on the surface of a negative electrode (such as a carbon electrode) to form a stable coating film. The coating film formed by the compound (5) is capable of reducing the resistance at the electrode interface, whereby an effect to accelerate intercalation of lithium ions to the negative electrode can be obtained. That is, the impedance at the negative electrode interface is made small by the coating film formed from the compound (5) in the nonaqueous electrolyte, whereby intercalation of lithium ions to the negative electrode will be accelerated.

The content of the compound (5) in the nonaqueous electrolyte is preferably at most 10 vol %, more preferably from 0.01 to 10 vol %, particularly preferably from 0.1 to 5.0 vol %, most preferably from 0.1 to 0.45 vol %, based on the total amount of the electrolyte with a view to providing nonflammability over a long period of time, suppressing phase separation in the nonaqueous electrolyte or generation of large amount of carbon dioxide gas and accomplishing both suppression of a decrease of the low temperature properties and improvement of the solubility of the lithium salt.

As the dielectric constant becomes high, the compound (5) is more likely to undergo phase separation in the nonaqueous electrolyte, and therefore, its amount should better be small. Further, if the compound (5) is too much, a large amount of carbon dioxide gas is likely to be formed by its decomposition, and it becomes difficult to maintain the nonflammability.

In a case where a chain carbonate of the compound (5-1) is used in combination with a cyclic carbonate of the compound (5-2) and/or the compound (5-3), the ratio (volume ratio of $V_1:V_2$) of the chain carbonate (volume: $V_1$) to the cyclic carbonate (volume: $V_2$) is preferably from 1:10 to 10:1.

(Other Solvents)

The nonaqueous electrolyte of the present invention may contain other solvents other than the hydrofluoroether, the glyme type solvent and the compound (5), within a range not to let the nonaqueous electrolyte undergo phase separation.

Such other solvents may, for example, be a carboxylic acid ester such as an alkyl propionate, a dialkyl malonate or an alkyl acetate, a cyclic ester such as γ-butyrolactone, a cyclic sulfonate such as propanesultone, an alkyl sulfonate and an alkyl phosphate.

The content of such other solvents is preferably at most 10 vol %, more preferably at most 5 vol %, per 100 vol % of the total amount of solvents used in the nonaqueous electrolyte.

Further, the nonaqueous electrolyte of the present invention may contain a solvent such as a fluorinated alkane for the purpose of suppressing the vapor pressure of the nonaqueous electrolyte or for the purpose of further improving the nonflammability of the nonaqueous electrolyte, within a range where the lithium salt is soluble in the nonaqueous electrolyte. The fluorinated alkane is meant for such a compound that at least one of hydrogen atoms in an alkane is substituted by a fluorine atom and a hydrogen atom remains. In the present invention, a $C_{4-12}$ fluorinated alkane is preferred. Among them, in a case where a fluorinated alkane having at least 6 carbon atoms is employed, an effect to lower the vapor pressure of the nonaqueous electrolyte can be expected, and if the number of carbon atoms is at most 12, the solubility of the lithium salt can easily be maintained. Further, the fluorine content in the fluorinated alkane (the fluorine content is meant for the proportion of the mass of fluorine atoms in the molecular weight) is preferably from 50 to 80%. When the fluorine content in the fluorinated alkane is made to be at least 55%, the nonflammability will be higher, and when it is at most 80%, the solubility of the lithium salt can be maintained.

As such a fluorinated alkane, a compound having a straight chain structure is preferred, and for example, $n\text{-}C_4F_9CH_2CH_3$, $n\text{-}C_6F_{13}CH_2CH_3$, $n\text{-}C_6F_{13}H$ or $n\text{-}C_8F_{17}H$ may be mentioned. The content of the solvent such as the fluorinated alkane is preferably at most 60 vol % per 100 vol % of the total amount of solvents used in the nonaqueous electrolyte in order to maintain the solubility of the lithium salt, and it is preferably at least 5 vol % to lower the vapor pressure or to further provide nonflammability.

Further, the nonaqueous electrolyte of the present invention may contain other components as the case requires, in order to improve the functions of the nonaqueous electrolyte. Such other components may, for example, be a conventional overcharge-preventing agent, a dehydrating agent, a deoxidizing agent, or a property-improving adjuvant to improve a cycle property or a volume-maintaining property after storage at a high temperature.

The overcharge-preventing agent may, for example, be an aromatic compound such as biphenyl, an alkylbiphenyl, terphenyl, partially hydrogenated terphenyl, cyclohexylbenzene, t-butylbenzene, t-amylbenzene, diphenyl ether or dibenzofuran; a partially fluorinated such aromatic compound, such as 2-fluorobiphenyl, o-cyclohexylfluorobenzene or p-cyclohexylfluorobenzene; or a fluorinated anisole compound such as 2,4-difluoroanisole, 2,5-difluoroanisole or 2,6-difluoroanisole. Such overcharge-preventing agents may be used alone or in combination as a mixture of two or more of them.

In a case where the nonaqueous electrolyte contains an overcharge-preventing agent, the content of the overcharge-preventing agent in the nonaqueous electrolyte is preferably from 0.01 to 5 mass %. By incorporating at least 0.1 mass % of the overcharge-preventing agent in the nonaqueous electrolyte, it becomes easier to prevent breakage or ignition of a secondary cell by overcharge, and it is possible to use the secondary cell more stably.

The dehydrating agent may, for example, be molecular sieves, salt cake, magnesium sulfate, calcium hydrate, sodium hydrate, potassium hydrate or lithium aluminum hydrate. As the solvent to be used for the nonaqueous electrolyte of the present invention, it is preferred to use one subjected to dehydration by the above dehydrating agent, followed by rectification. Otherwise, a solvent subjected to dehydration by the above dehydrating agent without rectification may be used.

The property-improvement adjuvant to improve the cycle property or the volume-maintaining property after storage at a high temperature, may, for example, be a carbonate compound such as phenylethylene carbonate, erythritan carbonate or spiro-bis-dimethylene carbonate; a carboxylic acid anhydride such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride or phenylsuccinic anhydride; a sulfur-containing compound such as ethylene sulfite, 1,3-propanesultone, 1,4- butanesultone, methyl methanesulfonate, busulfan, sulfolane, sulfolene, dimethylsulfone, diphenylsulfone, methylphenylsulfone, dibutyldisulfide, dicyclohexyldisulfide, tetramethylthiuram monosulfide, N,N-dimethylmethane sulfonamide or N,N-diethylmethane sulfonamide; a nitrogen-containing compound such as 1-methyl-2-pyrrolidinone, 1-methyl-2-piperidone, 3-methyl-2-oxazolidinone, 1,3-dimethyl-2-imidazolidinone or N-methylsuccinimide; a hydrocarbon solvent such as heptane, octane or cycloheptane; or a fluorinated aromatic compound such as fluorobenzene, difluorobenzene, hexafluorobenzene or benzotrifluoride. These property-improving adjuvants may be used alone or in combination as a mixture of two or more of them.

In a case where the nonaqueous electrolyte contains a property-improving adjuvant, the content of the property-improving adjuvant in the nonaqueous electrolyte is preferably from 0.01 to 5 mass %.

Further, in order to obtain a practically sufficient conductivity, the nonaqueous electrolyte of the present invention preferably has a conductivity at 25° C. of at least 0.25 S·m$^{-1}$, more preferably from 0.4 to 2.0 S·m$^{-1}$. Further, the viscosity (20° C.) measured by a rotary viscometer is preferably form 0.1 to 20 cP.

Further, the nonaqueous electrolyte of the present invention preferably has a flash point of at least 70° C. as measured by a Cleveland open-cup flash point test (in accordance with JIS K2265), and it is particularly preferred that it shows no flash point. Such a flash point of the nonaqueous electrolyte can be adjusted by adjusting the types or contents of the hydrofluoroether and the ether compound. For example, when the amount of the hydrofluoroether is at least 20 vol % based on the total amount of solvents, no flash point tends to be shown, and when m in the ether compound is at least 3, the flash point tends to be at least 70° C. However, the types and contents thereof may suitably be changed also in consideration of other performances required as an electrolyte.

Further, the nonaqueous electrolyte of the present invention is preferably an electrolyte having a reduction potential of at most 0.2 V at which the decomposition current value reaches 0.05 mA/cm$^2$ and an oxidation potential of at least 4.0 V at which the decomposition current value reaches 0.05 mA/cm$^2$. In the present invention, a potential range with the lower limit being the reduction potential at which the decomposition current value reaches 0.05 mA/cm$^2$ and the upper limit being the oxidation potential at which the decomposition current value reaches 0.05 mA/cm$^2$, is referred to as a potential window. Such a potential window can be accomplished by adjusting the molar ratio ($M_G$:$M_{Li}$) of the above compound (4) (molar amount: $M_G$) to the lithium salt (molar amount: $M_{Li}$) to be from 0.2:1 to 4:1. The measurement of the potential window can be carried out by the method which will be described in Examples. Here, the molar ratio ($M_G$:$M_{Li}$) is preferably from 0.5:1 to 4:1 in a case where each of $R^{10}$ and $R^{11}$ in the glyme type solvent is a methyl group.

The nonaqueous electrolyte of the present invention is particularly preferably an electrolyte, of which the potential range (potential window) within which the decomposition current value reaches 0.05 A/cm$^2$ is wider than a range of from 0.2 V to 4.2 V. The value of such a potential window is a value represented by a potential based on lithium metal. Such a potential window can be accomplished by adjusting the molar ratio ($M_G$:$M_{Li}$) of the above compound (4) (molar amount: $M_G$) to the lithium salt (molar amount: $M_{Li}$) to be from 1:1 to 4:1. The measurement of the potential window can be carried out by the method which will be described in Examples.

The nonaqueous electrolyte of the present invention is free from eroding an aluminum current collector, since $LiPF_6$ being a non-imide type lithium salt and a compound (1) being a cyclic lithium salt are used. Further, excellent nonflammability can be obtained, since a hydrofluoroether such as the compound (2) or the compound (3) is used as the solvent for the nonaqueous electrolyte. Further, by using the compound (4) being an ether compound, the lithium salt can be uniformly dissolved in the hydrofluoroether even without using a cyclic carbonate, whereby the obtainable nonaqueous electrolyte exhibits a practically sufficient conductivity. Further, since a large amount of a cyclic carbonate is not required, there is no trouble of generation of carbon dioxide gas, and the nonflammability can be maintained for a long period of time.

In a study of the present invention, it is considered that a lithium salt such as $LiPF_6$ or a cyclic lithium salt (compound (1)) forms a complex with the compound (4), and it has been found to be uniformly dissolved in the hydrofluoroether. Further, it has been found that the obtained nonaqueous electrolyte has a practically sufficient conductivity and a proper viscosity.

[Secondary Cell]

A secondary cell using the nonaqueous electrolyte of the present invention (hereinafter referred to simply as a secondary cell) is a secondary cell having a negative electrode and a positive electrode, and the nonaqueous electrolyte of the present invention.

The negative electrode may be an electrode containing a negative electrode active material which is electrochemically capable of storing or discharging lithium ions. As such a negative electrode active material, a known negative electrode active material for a lithium ion secondary cell can be used, and an artificial or natural graphite (graphite), a carbonaceous material such as amorphous carbon, a metal or metal compound such as metal lithium or a lithium alloy, which is capable of storing or discharging lithium ions, may be mentioned. Such negative electrode active materials may be used alone or in combination as a mixture of two or more of them.

Among them, a carbonaceous material is preferred as the negative electrode active material. Further, as such a carbonaceous material, graphite or a carbonaceous material having the surface of graphite covered with carbon amorphous as compared with the graphite, is particularly preferred.

The graphite preferably has a value d (interlayer distance, hereinafter referred to simply as a value d) of the lattice plane (002 face) being from 0.335 to 0.338 nm, more preferably from 0.335 to 0.337 nm, as obtained by X-ray diffraction by Gakushin-method. Further, the crystallite size (Lc) obtained by X-ray diffraction by Gakushin-method is preferably at least 30 nm, more preferably at least 50 nm, further preferably at least 100 nm. The ash content in the graphite is preferably at most 1 mass %, more preferably at most 0.5 mass %, further preferably at most 0.1 mass %.

Whereas the carbonaceous material having the surface of graphite covered with amorphous carbon is preferably such that graphite having a value d of from 0.335 to 0.338 nm is used as a nuclear material, the surface of such graphite is covered with amorphous carbon having a value d larger than the graphite, and the ratio of the nuclear material graphite (mass: $W_A$) to the amorphous carbon (mass: $W_B$) covering the graphite is preferably from 80/20 to 99/1 by mass ratio ($W_A$/$W_B$). By using such a carbonaceous material, it becomes easy to produce a negative electrode having a high capacity and being scarcely reactive with the nonaqueous electrolyte.

The particle diameter of the carbonaceous material is preferably at least 1 μm, more preferably at least 3 μm, further preferably at least 5 μm, particularly preferably at least 7 μm, by a median diameter by a laser diffraction scattering method. Here, the upper limit of the particle diameter of the carbonaceous material is preferably 100 µm, more preferably 50 µm, further preferably 40 µm, particularly preferably 30 µm.

The specific surface area of the carbonaceous material by a BET method is preferably at least 0.3 m$^2$/g, more preferably at least 0.5 m$^2$/g, further preferably at least 0.7 m$^2$/g, particularly preferably at least 0.8 m$^2$/g. The upper limit of the specific surface area of the carbonaceous material is preferably 25.0 m$^2$/g, more preferably 20.0 m$^2$/g, further preferably 15.0 m$^2$/g, particular preferably 10.0 m$^2$/g.

The carbonaceous material preferably has a value R (=$I_B$/$I_A$) of from 0.01 to 0.7, which is represented by a ratio of the peak intensity $I_B$ of peak $P_B$ within a range of from 1,300 to 1,400 cm$^{-1}$ to the peak intensity $I_A$ of peak $P_A$ within a range of from 1,570 to 1,620 cm$^{-1}$, as analyzed by a Raman spectrum using an argon ion laser beam. Further, the half value width of the peak $P_A$ is preferably at most 26 cm$^{-1}$, particularly preferably at most 25 cm$^{-1}$.

A metal which can be used as a negative electrode active material other than metal lithium may, for example, be Ag, Zn, Al, Ga, In, Si, Ti, Ge, Sn, Pb, P, Sb, Bi, Cu, Ni, Sr or Ba. Further, as a lithium alloy, an alloy of lithium with such a metal may be mentioned. Further, as a metal compound, an oxide of such a metal may, for example, be mentioned.

Among them, at least one metal selected from the group consisting of Si, Sn, Ge, Ti and Al, or a metal compound, metal oxide or lithium alloy containing such a metal, is preferred, and more preferred is at least one metal selected from the group consisting of Si, Sn and Al, or a metal compound, lithium alloy or lithium titanate containing such a metal.

A metal capable of storing or discharging lithium ions, a metal compound containing such a metal or a lithium alloy usually has a large capacity per unit mass as compared with a carbonaceous material represented by graphite and thus is suitable for a secondary cell which is required to have a higher energy density.

The positive electrode may, for example, be an electrode containing a positive electrode active material which is capable of electrochemically storing or discharging lithium ions.

As such a positive electrode active material, a known positive electrode active material for a lithium ion secondary cell may be used, and, for example, a lithium-containing transition metal oxide such as a lithium cobalt oxide, a lithium nickel oxide or lithium manganese oxide, a lithium-containing transition metal composite oxide using at least one transition metal, a transition metal oxide, a transition metal sulfide, a metal oxide or an olivine type metal lithium salt may, for example, be mentioned.

As a transition metal for the lithium-containing transition metal composite oxide, V, Ti, Cr, Mn, Fe, Co, Ni or Cu is, for example, preferred. For example, a lithium cobalt composite oxide such as LiCoO$_2$, a lithium nickel composite oxide such as LiNiO$_2$, a lithium manganese composite oxide such as LiMnO$_2$, LiMn$_2$O$_4$ or LiMnO$_3$, or one having a part of the transition metal atom constituting such a lithium transition metal composite oxide substituted by another metal such as Al, Ti, V, Cr, Mn, Fe, Co, Li, Ni, Cu, Zn, Mg, Ga, Zr, Si or Yb, may, for example, be mentioned. One having substituted by another metal may, for example, be LiMn$_{0.5}$Ni$_{0.5}$O$_2$, LiMn$_{1.8}$Al$_{0.2}$O$_4$, LiNi$_{0.85}$Co$_{0.10}$Al$_{0.05}$O$_2$, LiMn$_{1.5}$Ni$_{0.5}$O$_4$, LiNi$_{1/3}$Co$_{1/3}$Mn$_{1/3}$O$_2$ or LiMn$_{1.8}$Al$_{0.2}$O$_4$.

The transition metal oxide may, for example, be TiO$_2$, MnO$_2$, MoO$_3$, V$_2$O$_5$ or V$_6$O$_{13}$, and the transition metal sulfide may, for example, be TiS$_2$, FeS or MoS$_2$. The metal oxide may, for example, be SnO$_2$ or SiO$_2$.

The olivine type metal lithium salt is a substance represented by the formula Li$_L$X$_x$Y$_y$O$_z$F$_g$ (wherein X is Fe(II), Co(II), Mn(II), Ni(II), V(II) or Cu(II), Y is P or Si, 0≤L≤3, 1≤x≤2, 1≤y≤3, 4≤z≤12, 0≤g≤1) or a composite thereof. For example, LiFePO$_4$, Li$_3$Fe$_2$(PO$_4$)$_3$, LiFeP$_2$O$_7$, LiMnPO$_4$, LiNiPO$_4$, LiCoPO$_4$, Li$_2$FePO$_4$F, Li$_2$MnPO$_4$F, Li$_2$NiPO$_4$F, Li$_2$CoPO$_4$F, Li$_2$FeSiO$_4$, Li$_2$MnSiO$_4$, Li$_2$NiSiO$_4$ or Li$_2$CoSiO$_4$ may be mentioned.

These positive electrode active materials may be used alone or in combination as a mixture of two or more of them.

Further, it is possible to employ one having a substance with a composition different from the substance constituting the main body positive electrode active material, deposited on the surface of such a positive electrode active material. The substance to be deposited on the surface may, for example, be an oxide such as aluminum oxide, silicon oxide, titanium oxide, zirconium oxide, magnesium oxide, calcium oxide, boron oxide, antimony oxide or bismuth oxide; a sulfate such as lithium sulfate, sodium sulfate, potassium sulfate, magnesium sulfate, calcium sulfate or aluminum sulfate; or a carbonate such as lithium carbonate, calcium carbonate or magnesium carbonate.

With respect to the amount of the substance deposited on the surface, the lower limit of the mass to the positive electrode active material is preferably 0.1 ppm, more preferably 1 ppm, further preferably 10 ppm. The upper limit is preferably 20%, more preferably 10%, further preferably 5%. By the substance deposited on the surface, it is possible to prevent an oxidation reaction of the nonaqueous electrolyte at the surface of the positive electrode active material, whereby it is possible to improve the useful life of the cell.

The positive electrode active material is preferably a lithium-containing composite oxide having an α-NaCrO$_2$ structure as matrix, such as LiCoO$_2$, LiNiO$_2$ or LiMnO$_2$, or a lithium-containing composite oxide having a spinel structure as matrix, such as LiMn$_2$O$_4$, since its discharge voltage is high and its electrochemical stability is high.

The secondary cell of the present invention has a negative electrode and a positive electrode, and the nonaqueous electrolyte of the present invention, wherein either one or each of the negative electrode and the positive electrode is a polarizing electrode. The polarizing electrode is preferably one composed mainly of an electrochemically inactive material having a high specific surface area, and it is particularly preferably one made of activated carbon, carbon black, fine particles of a metal or fine particles of a conductive oxide. Among them, preferred is one having an electrode layer made of a carbon material powder having a high specific surface area such as activated carbon formed on the surface of a metal current collector. The nonaqueous electrolyte of the present invention is capable of dissolving a lithium salt well and being excellent in nonflammability and thus is useful for other charged devices. Such other charged devices may, for example, be an electrical double layer capacitor and a lithium ion capacitor.

In the preparation of an electrode, a binder to bind a negative electrode active material or a positive electrode active material is used.

As such a binder to bind a negative electrode active material or a positive electrode active material, any optional binder may be used so long as it is a material stable against the electrolyte or a solvent to be used during the production of the electrode. The binder may, for example, be a fluororesin such as polyvinylidene fluoride or polytetrafluoroethylene, a polyolefin such as polyethylene or polypropylene, a polymer having an unsaturated bond, such as styrene/butadiene rubber, isoprene rubber or butadiene rubber, or its copolymer, or an acrylic acid type polymer such as an acrylic acid copolymer or a methacrylic acid copolymer, or its copolymer. Such binders may be used alone or in combination as a mixture of two or more of them.

In an electrode, in order to increase the mechanical strength or electrical conductivity, a thickener, a conducting material, a filler, etc. may be incorporated.

The thickener may, for example, be carboxymethylcellulose, methylcellulose, hydroxymethylcellulose, ethylcellulose, polyvinyl alcohol, oxidized starch, phosphorylated starch, casein or polyvinylpyrrolidone. Such thickeners may be used alone or in combination as a mixture of two or more of them.

The conducting material may, for example, be a metal material such as copper or nickel, or a carbonaceous material such as graphite or carbon black. Such conducting materials may be used alone or in combination as a mixture of two or more of them.

As a process for producing an electrode, a binder, a thickener, a conducting material, a solvent, etc. are added to a negative electrode active material or a positive electrode active material to obtain a slurry, which is applied to a current collector, followed by drying to obtain an electrode. In such a case, it is preferred to carry out pressing after drying to compact the electrode.

If the density of the positive electrode active material layer is too low, the capacity of a secondary cell is likely to be inadequate.

As current collectors, various current collectors may be used, but usually a metal or an alloy is employed. As a current collector for a negative electrode, copper, nickel, stainless steel, etc. may be mentioned, and copper is preferred. Whereas as a current collector for a positive electrode, a metal such as aluminum, titanium or tantalum, or its alloy may be mentioned, and aluminum or its alloy is preferred, and aluminum is particularly preferred.

The shape of a secondary cell may be selected depending upon the particular application, and it may be a coin-form, a cylindrical form, an angular form or a laminate form. Further, the shapes of a positive electrode and a negative electrode may suitably be selected to meet with the shape of the secondary cell.

The charging voltage for the secondary cell of the present invention is preferably at least 3.4 V, more preferably at least 4.0 V, particularly preferably at least 4.2 V. In a case where the positive electrode active material for the secondary cell is a lithium-containing transition metal oxide, a lithium-containing transition metal composite oxide, a transition metal oxide, a transition metal sulfide or a metal oxide, the charging voltage is preferably at least 4.0 V, more preferably at least 4.2 V. On the other hand, in a case where the positive electrode active material is an olivine type metal lithium salt, the charging voltage is preferably at least 3.2 V, more preferably at least 3.4 V. The nonaqueous electrolyte of the present invention has oxidation resistance at 4.2 V or higher and reduction resistance at 0.2 V or lower, and accordingly, the electrolyte of the present invention can be used for optional electrodes having operating potentials within such a range.

Further, the secondary cell of the present invention is particularly preferably a secondary cell to be used at a charging voltage of at least 4.2 V (potential based on lithium metal). For example, a secondary cell may be mentioned which has the nonaqueous electrolyte of the present invention with a potential window being wider than the range of from 0 V to 4.2 V.

Between a positive electrode and a negative electrode in a secondary cell, a porous film is usually interposed as a separator in order to prevent short circuit. In such a case, the nonaqueous electrolyte is used as impregnated to the porous film. The material or shape of the porous film is not particularly limited so long as it is stable and excellent in a liquid holding property to the nonaqueous electrolyte, and it is preferably a porous sheet or non-woven fabric made of a fluororesin such as polyvinylidene fluoride, polytetrafluoroethylene or a copolymer of ethylene and tetrafluoroethylene, or a polyolefin such as polyethylene or polypropylene, and the material is preferably a polyolefin such as polyethylene or polypropylene. Further, a gelled one having the electrolyte impregnated to such a porous film, may be used as a gel electrolyte.

The cell sheathing material to be used for the nonaqueous electrolyte of the present invention may also be a material commonly used for secondary cells, and it may, for example, be nickel-plated iron, stainless steel, aluminum or its alloy, nickel, titanium, a resin material or a film material.

The secondary cell of the present invention employs the above-described nonaqueous electrolyte, whereby it is free from ignition and excellent in nonflammability even if an excessive load such as excessive heat, excessive charging, internal short circuiting or external short circuiting, may be exerted to the secondary cell. Accordingly, it is not required to provide a complicated monitoring system to monitor the above-described excessive load in the secondary cell.

Thus, the secondary cell of the present invention may be used for various applications, such as cell phones, portable game machines, digital cameras, digital video cameras, electric tools, notebook computers, handheld terminals, portable music players, electric cars, hybrid cars, electric trains, airplanes, satellites, submarines, ships, permanent power supply devices, robots and power storage systems. Further, the secondary cell of the present invention is excellent particularly in safety and thus has particularly preferable characteristics as a large size secondary cell for e.g. electric cars, hybrid cars, electric trains, airplanes, satellites, submarines, ships, permanent power supply devices, robots and power storage systems.

As described in the foregoing, when the nonaqueous electrolyte for a secondary cell of the present invention is used for a secondary cell, there will be no problem of erosion of an aluminum current collector or generation of carbon dioxide gas. Further, it is provided with a long term nonflammability and a practically sufficient conductivity.

EXAMPLES

Now, the present invention will be described in detail. However, it should be understood that the present invention is by no means thereby restricted.

Examples 1 to 73, 105, 111 and 114 are Working Examples of the present invention, and Examples 101 to 104, 106 to 110, 112 and 113 are Comparative Examples.

Evaluation of Solubility and Conductivity

Example 1

Tetraglyme (1.30 g, 5.9 mmol) as a compound (4) (glyme type solvent) and the compound (1-2) (hereinafter referred to as CTFSI-Li) (1.46 g, 5.9 mmol) as a lithium salt were mixed in equal molar amounts, and then HFE347pc-f ($CF_3CH_2OCF_2CF_2H$, 2.99 g, 2.0 ml) as a hydrofluoroether was added and mixed to obtain a nonaqueous electrolyte.

Examples 2 to 8

Nonaqueous electrolytes were obtained in the same manner as in Example 1 except that the composition of the lithium salt, the compound (4) and the hydrofluoroether was changed as shown in Table 1. However, in Example 8, in addition to the composition shown in Table 1, ethylene carbonate was added in an amount of 2.64 g.

Examples 101 to 103

Nonaqueous electrolytes were obtained in the same manner as in Example 1 except that CTFSI-Li was used as a lithium salt, and without using the hydrofluoroether of the present invention, other solvents were used as shown in Table 1.

Example 104

A nonaqueous electrolyte was obtained in the same manner as in Example 1 except that without using the hydrofluoroether, the solvent was the compound (4) only as shown in Table 1.

Example 105

Diglyme (6.71 g, 50 mmol) as a compound (4) (glyme type solvent) and the compound (1-2) (hereinafter referred to as CTFSI-Li) (2.49 g, 10 mmol) as a lithium salt were mixed, and then HFE347pc-f ($CF_3CH_2OCF_2CF_2H$, 14.7 g, 10 mL) as a hydrofluoroether was added and mixed to obtain a nonaqueous electrolyte.

Example 106

Without using the hydrofluoroether, the solvent was diglyme (13.4 g, 100 mmol) only as a compound (4), and it was mixed with the compound (1-2) (hereinafter referred to as CTFSI-Li) (2.49 g, 10 mmol) as a lithium salt to obtain a nonaqueous electrolyte.

Example 107

Without using a hydrofluoroether or a compound (4) as a solvent, 10 mL of a solvent prepared by mixing ethylene carbonate and ethylmethyl carbonate in the same volume amounts was used as a solvent, and 10 mmol of $LiPF_6$ as a lithium salt was dissolved to obtain a nonaqueous electrolyte.

[Evaluation Methods]

With respect to the nonaqueous electrolytes obtained in Examples 1 to 8 and 101 to 107, solubility tests, conductivity measurements and ignition tests were carried out.

In a solubility test, the state of dissolution of the nonaqueous electrolyte after expiration of 1 hour from the preparation of the nonaqueous electrolyte, was visually evaluated. In the evaluation, one uniformly dissolved was identified by "◯", and one underwent phase separation into two phases was identified by "×".

A conductivity measurement was carried out with respect to the obtained nonaqueous electrolyte at 15° C. by using a conductivity meter (glass electrode type hydrogen ion concentration meter WM-22EP, manufactured by DKK-Toa Corporation).

In an ignition test, 10 mL of the nonaqueous electrolyte was charged into a 20 mL glass vial, and then, the vapor phase of 5 mm above the electrolyte surface was subjected to flaming by a lighter, whereby one ignited in less than 15 seconds was identified by "×", one ignited from 15 seconds to less than 30 seconds was identified by "Δ", and one not ignited even after 30 minutes was identified by "◯".

The results of the solubility tests, conductivity measurements and ignition tests of the nonaqueous electrolytes of Examples 1 to 8 and 101 to 107 are shown in Table 1.

TABLE 1

| | | | | Examples | | | | | | | | |
|---|---|---|---|---|---|---|---|---|---|---|---|---|
| | | | | Ex. 1 | Ex. 2 | Ex. 3 | Ex. 4 | Ex. 5 | Ex. 6 | Ex. 7 | Ex. 8 | Ex. 105 |
| Lithium salt | | $LiPF_6$ | [mmol] | — | — | — | — | — | — | — | 50.0 | — |
| | | | [g] | — | — | — | — | — | — | — | 7.60 | — |
| | Compound (1) | CTFSI-Li | [mmol] | 5.86 | 3.05 | 4.50 | 6.10 | 3.01 | 4.54 | 6.06 | — | 10.0 |
| | | | [g] | 1.46 | 0.76 | 1.12 | 1.52 | 0.75 | 1.13 | 1.51 | — | 2.49 |
| Hydrofluoro-ether | Compound (2) | HFE347pc-f | [ml] | 2.0 | 2.0 | 2.0 | — | — | — | — | 40.0 | 10.0 |
| | | HFE449mec-f | [ml] | — | — | — | 2.0 | 2.0 | 2.0 | — | — | — |
| | | HFE458pcf-c | [ml] | — | — | — | — | — | — | 2.0 | — | — |
| Ether compound | Compound (4) | Diglyme | [mmol] | — | — | — | — | — | — | — | — | 50.0 |
| | | | [g] | — | — | — | — | — | — | — | — | 6.71 |
| | | Triglyme | [mmol] | — | — | — | — | — | — | — | 44.3 | — |
| | | | [g] | — | — | — | — | — | — | — | 7.9 | — |
| | | Tetraglyme | [mmol] | 5.90 | 3.10 | 4.50 | 6.10 | 3.00 | 4.50 | 6.00 | — | — |
| | | | [g] | 1.31 | 0.69 | 1.00 | 1.36 | 0.67 | 1.00 | 1.33 | — | — |
| Other solvents | | AC6000 | [ml] | — | — | — | — | — | — | — | — | — |
| | | HFE7300 | [ml] | — | — | — | — | — | — | — | — | — |
| | | HFE7200 | [ml] | — | — | — | — | — | — | — | — | — |
| | | EC/EMC | [ml] | — | — | — | — | — | — | — | — | — |
| | Concentration of lithium salt | | [mol/L] | 1.78 | 1.14 | 1.51 | 1.82 | 1.13 | 1.52 | 1.83 | 1.04 | 0.59 |
| Evaluation | | Solubility | | ◯ | ◯ | ◯ | ◯ | ◯ | ◯ | ◯ | ◯ | ◯ |
| | | Conductivity (15° C.) | [S/m] | 0.39 | 0.50 | 0.48 | 0.29 | 0.32 | 0.33 | 0.29 | 0.35 | 0.57 |
| | | Flammability | | ◯ | ◯ | ◯ | ◯ | ◯ | ◯ | ◯ | ◯ | Δ |

| | | | | Comparative Examples | | | | | |
|---|---|---|---|---|---|---|---|---|---|
| | | | | Ex. 101 | Ex. 102 | Ex. 103 | Ex. 104 | Ex. 106 | Ex. 107 |
| Lithium salt | | $LiPF_6$ | [mmol] | — | — | — | — | — | 10.0 |
| | | | [g] | — | — | — | — | — | 1.52 |
| | Compound (1) | CTFSI-Li | [mmol] | 3.01 | 2.61 | 2.61 | 44.2 | 10.0 | — |
| | | | [g] | 0.75 | 0.65 | 0.65 | 11.00 | 2.49 | — |
| Hydrofluoro-ether | Compound (2) | HFE347pc-f | [ml] | — | — | — | — | — | — |
| | | HFE449mec-f | [ml] | — | — | — | — | — | — |
| | | HFE458pcf-c | [ml] | — | — | — | — | — | — |
| Ether compound | Compound (4) | Diglyme | [mmol] | — | — | — | — | 100 | — |
| | | | [g] | — | — | — | — | 13.40 | — |
| | | Triglyme | [mmol] | — | — | — | — | — | — |
| | | | [g] | — | — | — | — | — | — |

TABLE 1-continued

|  |  |  |  |  |  |  |  |  |
|---|---|---|---|---|---|---|---|---|
|  | Tetraglyme |  | [mmol] | 3.00 | 3.00 | 3.00 | 34.1 | — | — |
|  |  |  | [g] | 0.67 | 0.67 | 0.67 | 7.59 | — | — |
| Other solvents | AC6000 |  | [ml] | 1.0 | — | — | — | — | — |
|  | HFE7300 |  | [ml] | — | 1.0 | — | — | — | — |
|  | HFE7200 |  | [ml] | — | — | 1.0 | — | — | — |
|  | EC/EMC |  | [ml] | — | — | — | — | — | 10.0 |
| Concentration of lithium salt |  |  | [mol/L] | — | — | — | 5.9 | 0.71 | 1.00 |
| Evaluation | Solubility |  |  | X | X | X | ○ | ○ | ○ |
|  | Conductivity (15° C.) | [S/m] |  | — | — | — | 0.044 | 0.70 | 0.81 |
|  | Flammability |  |  | — | — | — | ○ | X | X |

Abbreviations in Table 1 have the following meanings.
HFE347pc-f: $CF_3CH_2OCF_2CF_2H$
HFE458pcf-c: $CHF_2CF_2CH_2OCF_2CF_2H$
HFE449mec-f: $CF_3CH_2OCF_2CHFCF_3$
AC6000: $CF_3CF_2CF_2CF_2CF_2CF_2CH_2CH_3$
HFE7300: $CF_3CF_2CF_2CF_2CF_2CF_2OCH_3$
HFE7200: $CF_3CF_2CF_2CF_2OCH_2CH_3$
EC/EMC: Solvent mixture of ethylene carbonate and ethylmethyl carbonate in the same volumes As shown in Table 1, in Examples 1 to 8 representing the nonaqueous electrolytes of the present invention, the lithium salt was sufficiently uniformly dissolved in the hydrofluoroether, and the conductivity showed a sufficient value exceeding $0.25$ $S·m^{-1}$.

On the other hand, in Examples 101 to 103 wherein solvents other than the hydrofluoroether of the present invention were used, it was not possible to uniformly dissolve the lithium salt, and the nonaqueous electrolytes underwent phase separation into two phases. Further, in Example 104 wherein no hydrofluoroether was employed, the conductivity was remarkably low although the nonaqueous electrolyte was uniform. Further, in Example 105 wherein although a hydrofluoroether was employed, diglyme was used in an amount of 5 equivalents to the lithium salt, good compatibility and conductivity were obtained, and nonflammability of less than 30 seconds was also obtained against flaming by a lighter. Further, in each of Example 106 wherein diglyme was used in an amount of 10 equivalents to the lithium salt without using a hydrofluoroether and Example 107 wherein a carbonate type solvent was used without using a hydrofluoroether or glyme as a solvent, although good compatibility and conductivity were obtained, the electrolytes were easily ignited by flaming by a lighter.

Evaluation of Potential Window

Examples 9 and 10

By using the nonaqueous electrolytes prepared in Examples 2 and 8, LSV (linear sweep voltammetry) measurements were carried out to measure the potential windows (potentials based on lithium metal) of the nonaqueous electrolytes.

For a working electrode and a counter electrode, platinum plates of 2.0 cm×1.5 cm were used, and for a reference electrode, a lithium foil of 2.0 cm×2.0 cm was used. The sweep rate was 5 $mV·s^{-1}$. Further, the time when the current value exceeded 0.05 $mA·cm^{-2}$ was taken as the withstand voltage limit.

The results of measurements of the potential windows in Examples 9 and 10 are shown in Table 2.

TABLE 2

|  | Nonaqueous electrolyte used | Potential window [V vs Li/Li$^+$] |
|---|---|---|
| Example 9 (present invention) | Nonaqueous electrolyte of Example 2 | 0.07 to 4.57 |
| Example 10 (present invention) | Nonaqueous electrolyte of Example 8 | 0.02 to 4.97 |

As shown in Table 2, in Examples 9 and 10, the nonaqueous electrolytes had sufficient potential windows for practical use for lithium ion secondary cells.

Examples 11 to 14

Using triglyme as a glyme type solvent and using $LiPF_6$ as a lithium salt, the withstand voltage measuring test was carried out by changing the molar ratio of the glyme type solvent to the lithium salt. By adjusting the molar ratio of the triglyme to the lithium salt to 1:1 (Example 11), 2:1 (Example 12), 3:1 (Example 13) or 4:1 (Example 14), nonaqueous electrolytes having them dissolved in a hydrofluoroether (HFE347) so that the concentration of the lithium salt would be 1 M, were prepared. Using the prepared nonaqueous electrolytes, LSV measurements were carried out to measure the potential windows (potentials based on lithium metal). For a working electrode and a counter electrode, platinum plates of 2.0 cm×1.5 cm were used, and for a reference electrode, a lithium foil of 2.0 cm×2.0 cm was used. The sweep rate was 5 $mV·s^{-1}$. Further, the time when the current value exceeded 0.05 $mA·cm^{-2}$ was taken as the withstand voltage limit.

Examples 108 and 109

Using the nonaqueous electrolytes prepared in Examples 105 and 106, LSV measurements were carried out by using the same method as in Examples 11 to 14 to measure potential windows, which were designated as Examples 108 and 109, respectively.

The results of measurement of potential windows in Examples 11 to 14 and Examples 108 and 109 are shown in Table 3.

TABLE 3

|  |  | HFE347 [g] | Ether compound [mmol] | Li salt [mmol] | Ether compound:Lithium salt [molar ratio] | Potential window [V vs Li/Li$^+$] |
|---|---|---|---|---|---|---|
| Examples | Ex. 11 | 35.3 | Triglyme 30 (5.34 g) | LPF$_6$ 30 (4.56 g) | 1:1 | 0.01 to 4.81 |

TABLE 3-continued

|  |  | HFE347 [g] | Ether compound [mmol] | Li salt [mmol] | Ether compound:Lithium salt [molar ratio] | Potential window [V vs Li/Li$^+$] |
|---|---|---|---|---|---|---|
|  | Ex. 12 | 26.5 | Triglyme 60 (10.7 g) | LPF$_6$ 30 (4.56 g) | 2:1 | 0.02 to 4.85 |
|  | Ex. 13 | 17.6 | Triglyme 90 (15.9 g) | LPF$_6$ 30 (4.56 g) | 3:1 | 0.01 to 4.61 |
|  | Ex. 14 | 8.8 | Triglyme 120 (21.4 g) | LPF$_6$ 30 (4.56 g) | 4:1 | 0.07 to 4.50 |
| Comparative Examples | Ex. 108 | 14.7 | Diglyme 50 (6.71 g) | CTFSI-Li 10 (2.49 g) | 5:1 | 0.01 to 4.47 |
|  | Ex. 109 | 0 | Diglyme 100 (13.4 g) | CTFSI-Li 10 (2.49 g) | 10:1 | 0.00 to 4.43 |

As shown in Table 3, in Examples 11 to 14 and Example 108 wherein the molar ratio of the glyme type solvent to the lithium salt was adjusted to be from 1:1 to 5:1, the electrolytes had sufficient potential windows.

Evaluation of Solubility and Conductivity

Examples 15 to 37

Nonaqueous electrolytes were obtained in the same manner as in Example 1 except that the composition of the lithium salt, the compound (4) and the hydrofluoroether was changed as shown in Table 4.

Evaluation of the obtained nonaqueous electrolytes was carried out in the same manner as in Examples 1 to 8. The results of the solubility tests, conductivity measurements and ignition tests of the nonaqueous electrolytes are shown in Table 4.

TABLE 4

|  |  |  |  | Examples |  |  |  |  |  |  |  |  |  |  |  |
|---|---|---|---|---|---|---|---|---|---|---|---|---|---|---|---|
|  |  |  |  | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
| Lithium salt [mmol] | LiPF$_6$ | | [mmol] | 30.0 | 30.0 | 30.0 | 30.0 | 30.0 | 30.0 | 30.0 | — | — | 24.0 | 36.0 | 18.0 |
|  |  |  | [g] | 4.56 | 4.56 | 4.56 | 4.56 | 4.56 | 4.56 | 4.56 | — | — | 3.65 | 5.47 | 2.73 |
|  | Compound (1) | CTFSI-Li | [mmol] | — | — | — | — | — | — | — | 30.0 | 30.0 | — | — | — |
|  |  |  | [g] | — | — | — | — | — | — | — | 7.47 | 7.47 | — | — | — |
| Hydrofluoroether [ml] | Compound (2) | HFE347pc-f | [ml] | 30.0 | — | — | 30.0 | 30.0 | 30.0 | 30.0 | 30.0 | 30.0 | 30.0 | 30.0 | 30.0 |
|  |  | HFE449mec-f | [ml] | — | 30.0 | — | — | — | — | — | — | — | — | — | — |
|  |  | HFE458pcf-c | [ml] | — | — | — | — | — | — | — | — | — | — | — | — |
|  | Compound (3) | SX-1 | [ml] | — | — | 30.0 | — | — | — | — | — | — | — | — | — |
| Glyme type solvent | Compound (4) | Monoglyme | [mmol] | — | — | — | — | — | — | 60.0 | — | — | — | — | — |
|  |  |  | [g] | — | — | — | — | — | — | 5.41 | — | — | — | — | — |
|  |  | Diglyme | [mmol] | 60.0 | 60.0 | 60.0 | 39.9 | 48.0 | — | — | 39.9 | — | 31.9 | 47.9 | — |
|  |  |  | [g] | 8.05 | 8.05 | 8.05 | 5.35 | 6.44 | — | — | 5.35 | — | 4.28 | 6.44 | — |
|  |  | Triglyme | [mmol] | — | — | — | — | — | 60.0 | — | — | 30.0 | — | — | — |
|  |  |  | [g] | — | — | — | — | — | 10.7 | — | — | 5.35 | — | — | — |
|  |  | Tetraglyme | [mmol] | — | — | — | — | — | — | — | — | — | — | — | 18.0 |
|  |  |  | [g] | — | — | — | — | — | — | — | — | — | — | — | 4.00 |
| Concentration of lithium salt |  |  | [mol/L] | 0.78 | 0.78 | 0.78 | 0.84 | 0.81 | 0.73 | 0.83 | 0.84 | 0.85 | 0.7 | 0.98 | 0.53 |
| Evaluation | Solubility |  |  | ◯ | ◯ | ◯ | ◯ | ◯ | ◯ | ◯ | ◯ | ◯ | ◯ | ◯ | ◯ |
|  | Conductivity (15° C.) [S/m] |  |  | 0.79 | 0.44 | 0.53 | 0.42 | 0.61 | 0.48 | 0.38 | 0.30 | 0.25 | 0.36 | 0.43 | 0.54 |
|  | Flammability |  |  | ◯ | ◯ | ◯ | ◯ | ◯ | ◯ | ◯ | ◯ | ◯ | ◯ | ◯ | ◯ |

|  |  |  |  | Examples |  |  |  |  |  |  |  |  |  |  |
|---|---|---|---|---|---|---|---|---|---|---|---|---|---|---|
|  |  |  |  | Ex. 27 | Ex. 28 | Ex. 29 | Ex. 30 | Ex. 31 | Ex. 32 | Ex. 33 | Ex. 34 | Ex. 35 | Ex. 36 | Ex. 37 |
| Lithium salt [mmol] | LiPF$_6$ | | [mmol] | 30.0 | 42.0 | 30.0 | 24.0 | 30.0 | — | 24.0 | 30.0 | 36.0 | 42.0 | — |
|  |  |  | [g] | 4.56 | 6.38 | 4.56 | 3.65 | 4.56 | — | 3.65 | 4.56 | 5.47 | 6.38 | — |
|  | Compound (1) | CTFSI-Li | [mmol] | — | — | — | — | — | 30.0 | — | — | — | — | 30.0 |
|  |  |  | [g] | — | — | — | — | — | 7.47 | — | — | — | — | 7.47 |
| Hydrofluoro- | Compound | HFE347pc-f | [ml] | 30.0 | 30.0 | 30.0 | 30.0 | 30.0 | 30.0 | — | — | — | 30.0 | 30.0 |

TABLE 4-continued

| | | | | | | | | | | | | | | |
|---|---|---|---|---|---|---|---|---|---|---|---|---|---|---|
| ether (2) [ml] | | HFE449mec-f | [ml] | — | — | — | — | — | — | — | — | — | — | — |
| | | HFE458pcf-c | [ml] | — | — | — | — | — | — | 30.0 | 30.0 | 30.0 | — | — |
| | Compound (3) | SX-1 | [ml] | — | — | — | — | — | — | — | — | — | — | — |
| Ether compound | Compound (4) | Monoglyme | [mmol] | — | — | 90.0 | — | — | — | — | — | — | — | — |
| | | | [g] | — | — | 8.11 | — | — | — | — | — | — | — | — |
| | | Diglyme | [mmol] | — | — | — | 72.0 | 90.0 | — | 48.0 | 60.0 | 72.0 | 84.0 | 60.0 |
| | | | [g] | — | — | — | 9.66 | 12.1 | — | 6.44 | 8.05 | 9.66 | 11.3 | 8.05 |
| | | Triglyme | [mmol] | — | — | — | — | — | — | — | — | — | — | — |
| | | | [g] | — | — | — | — | — | — | — | — | — | — | — |
| | | Tetraglyme | [mmol] | 30.0 | 42.0 | — | — | — | 30.0 | — | — | — | — | — |
| | | | [g] | 6.67 | 9.34 | — | — | — | 6.67 | — | — | — | — | — |
| | Concentration of lithium salt | | [mol/L] | 0.82 | 1.07 | 0.76 | 0.60 | 0.70 | 0.82 | 0.65 | 0.78 | 0.94 | 1.00 | 0.78 |
| Evaluation | Solubility | | | ○ | ○ | ○ | ○ | ○ | ○ | ○ | ○ | ○ | ○ | ○ |
| | Conductivity (15° C.) [S/m] | | | 0.73 | 0.77 | 0.72 | 0.65 | 0.68 | 0.45 | 0.47 | 0.50 | 0.51 | 0.79 | 0.66 |
| | Flammability | | | ○ | ○ | ○ | ○ | ○ | ○ | ○ | ○ | ○ | ○ | ○ |

Abbreviations in Table 4 have the following meanings.
HFE347pc-f: $CF_3CH_2OCF_2CF_2H$
HFE458pcf-c: $CHF_2CF_2CH_2OCF_2CF_2H$
HFE449mec-f: $CF_3CH_2OCF_2CHFCF_3$
SX-1: Compound (3) wherein X is $CH_2CH_2$ As shown in Table 4, in Examples 15 to 37 representing nonaqueous electrolytes of the present invention, the lithium salt was sufficiently uniformly dissolved in the hydrofluoroether, and the conductivity showed an adequate value of at least $0.25$ S·m$^{-1}$.

Evaluation of Potential Window

Examples 38 to 60

Using the nonaqueous electrolytes prepared in Examples 15 to 37, LSV measurements were carried out to measure the potential windows (potentials based on lithium metal) of the nonaqueous electrolytes. The measurements of the potential windows were carried out by the same method as in Examples 9 and 10.

The results of measurement of the potential windows in Examples 38 to 60 are shown in Table 5.

TABLE 5

| | | Nonaqueous electrolyte used | Potential window [V vs Li/Li$^+$] |
|---|---|---|---|
| Examples | Example 38 | Nonaqueous electrolyte of Example 15 | 0.01 to 4.79 |
| | Example 39 | Nonaqueous electrolyte of Example 16 | 0.07 to 4.70 |
| | Example 40 | Nonaqueous electrolyte of Example 17 | 0.05 to 4.72 |
| | Example 41 | Nonaqueous electrolyte of Example 18 | 0.04 to 4.88 |
| | Example 42 | Nonaqueous electrolyte of Example 19 | Less than 0.00 to 4.90 |
| | Example 43 | Nonaqueous electrolyte of Example 20 | Less than 0.00 to 4.79 |
| | Example 44 | Nonaqueous electrolyte of Example 21 | 0.18 to 4.66 |
| | Example 45 | Nonaqueous electrolyte of Example 22 | 0.08 to 4.88 |
| | Example 46 | Nonaqueous electrolyte of Example 23 | Less than 0.00 to more than 5.00 |
| | Example 47 | Nonaqueous electrolyte of Example 24 | Less than 0.00 to 4.82 |
| | Example 48 | Nonaqueous electrolyte of Example 25 | Less than 0.00 to 4.76 |
| | Example 49 | Nonaqueous electrolyte of Example 26 | Less than 0.00 to more than 5.00 |
| | Example 50 | Nonaqueous electrolyte of Example 27 | Less than 0.00 to 4.99 |
| | Example 51 | Nonaqueous electrolyte of Example 28 | Less than 0.00 to 4.90 |
| | Example 52 | Nonaqueous electrolyte of Example 29 | Less than 0.00 to 4.84 |
| | Example 53 | Nonaqueous electrolyte of Example 30 | Less than 0.00 to 4.89 |
| | Example 54 | Nonaqueous electrolyte of Example 31 | Less than 0.00 to 4.81 |
| | Example 55 | Nonaqueous electrolyte of Example 32 | Less than 0.00 to more than 5.00 |
| | Example 56 | Nonaqueous electrolyte of Example 33 | Less than 0.00 to 4.93 |
| | Example 57 | Nonaqueous electrolyte of Example 34 | Less than 0.00 to 4.95 |
| | Example 58 | Nonaqueous electrolyte of Example 35 | Less than 0.00 to 4.94 |
| | Example 59 | Nonaqueous electrolyte of Example 36 | Less than 0.00 to 4.89 |
| | Example 60 | Nonaqueous electrolyte of Example 37 | Less than 0.00 to 4.97 |

As shown in Table 5, in Examples 38 to 60, the nonaqueous electrolytes had potential windows practically sufficient for lithium ion secondary cells.

Example 61

Triethylene glycol diethyl ether (6.19 g) as a compound (4) (glyme type solvent) and LiPF$_6$ (4.56 g) as a lithium salt are mixed in equal molar amounts, and HFE347pc-f ($CF_3CH_2OCF_2CF_2H$, 46.5 g) as a hydrofluoroether is added and mixed to obtain a colorless transparent uniform solution as a nonaqueous electrolyte. The conductivity of the nonaqueous electrolyte is evaluated and found to be at least 0.25 S/m. Further, its potential window is evaluated, whereby it is found to have a potential window wider than from 0.2 to 4.5 V (vs Li/Li$^+$).

Example 62

Triglyme (5.35 g) as a compound (4) (glyme type solvent) and FO$_2$SN(Li)SO$_2$F (5.40 g) as a lithium salt are mixed in equal molar amounts, and HFE347pc-f ($CF_3CH_2OCF_2CF_2H$, 46.5 g) as a hydrofluoroether is added and mixed to obtain a colorless transparent uniform solution as a nonaqueous electrolyte. The conductivity of the nonaqueous electrolyte is evaluated and found to be at least 0.25 S/m. Further, its potential window is evaluated, whereby it is found to have a potential window wider than from 0.2 to 4.5 V (vs Li/Li$^+$).

Example 63

The measurement of the conductivity of the nonaqueous electrolyte prepared in Example 15 was evaluated at each temperature of −35° C., −25° C., −15° C., −5° C., 5° C., 15° C., 25° C., 35° C. and 45° C.

Example 64

The measurement of the conductivity of the nonaqueous electrolyte prepared in Example 18 was evaluated at each temperature of −35° C., −25° C., −15° C., −5° C., 5° C., 15° C., 25° C., 35° C. and 45° C.

Example 110

The measurement of the conductivity of the nonaqueous electrolyte prepared in Example 107 was evaluated at each temperature of −35° C., −25° C., −15° C., −5° C., 5° C., 15° C., 25° C., 35° C. and 45° C.

The results of measurement of the conductivities in Examples 63, 64 and 110 are shown in Table 6 and FIG. 1. In the electrolyte of Example 110, partial solidification started from −25° C., and as shown in Table 6 and FIG. 1, at −35° C., it became impossible to measure the conductivity. Whereas in Examples 63 and 64, the electrolytes maintained practical conductivities without solidification even under a very low temperature condition at a level of −35° C.

TABLE 6

| | Conductivity (S/m) | | |
|---|---|---|---|
| Temperature (° C.) | Example 63 (present invention) | Example 64 (present invention) | Example 110 (Comparative Example) |
| −35 | 0.24 | 0.13 | Not measurable |
| −25 | 0.34 | 0.15 | 0.10 |
| −15 | 0.48 | 0.21 | 0.35 |
| −5 | 0.59 | 0.29 | 0.50 |
| 5 | 0.68 | 0.36 | 0.65 |
| 15 | 0.79 | 0.42 | 0.81 |
| 25 | 0.93 | 0.48 | 1.04 |
| 35 | 1.03 | 0.53 | 1.14 |
| 45 | 1.23 | 0.51 | 1.35 |

Examples 65 to 68

Nonaqueous electrolytes were obtained in the same manner as in Example 1 except that a hydrofluorocarbon was added in addition to the lithium salt, the compound (4) and the hydrofluoroether to change the composition as shown in Table 7.

Evaluation of the obtained nonaqueous electrolytes was carried out in the same manner as in Examples 1 to 8. The results of the solubility tests, conductivity measurements and ignition tests of the nonaqueous electrolytes are shown in Table 7.

TABLE 7

| | | | Examples | | | |
|---|---|---|---|---|---|---|
| | | | Ex. 65 | Ex. 66 | Ex. 67 | Ex. 68 |
| Lithium salt | LiPF$_6$ | [mmol] | 30.0 | 30.0 | 30.0 | 30.0 |
| | | [g] | 4.56 | 4.56 | 4.56 | 4.56 |
| Hydrofluoro-ether | HFE347pc-f | [ml] | 28.5 | 25.5 | 28.5 | 25.5 |
| Hydrofluoro-carbon | AC4000 | [ml] | — | — | 1.5 | 4.5 |
| | AC6000 | [ml] | 1.5 | 4.5 | — | — |
| Ether compound | Diglyme | [mmol] | 60.0 | 60.0 | 60.0 | 60.0 |
| | | [g] | 8.05 | 8.05 | 8.05 | 8.05 |
| Concentration of lithium salt | | [mol/L] | 0.78 | 0.78 | 0.78 | 0.78 |
| Evaluation | Solubility | | ○ | ○ | ○ | ○ |
| | Conductivity (15° C.) [S/m] | | 0.78 | 0.63 | 0.67 | 0.72 |
| | Flammability | | ○ | ○ | ○ | ○ |

Abbreviations in Table 7 have the following meanings.
HFE347pc-f: $CF_3CH_2OCF_2CF_2H$
AC6000: $CF_3CF_2CF_2CF_2CF_2CF_2CH_2CH_3$
AC4000: $CF_3CF_2CF_2CF_2CH_2CH_3$ As shown in Table 7, in Example 65 to 68 representing nonaqueous electrolytes of the present invention, the lithium salt was sufficiently uniformly dissolved in the solvent mixture of the hydrofluoroether and the hydrofluorocarbon, and the conductivities also showed sufficient values exceeding 0.25 S·m$^{-1}$.

Evaluation of Sheet-Form Nonaqueous Electrolyte Secondary Cell with Single-Pole Cell Comprising LiCoO$_2$ Positive Electrode-Lithium Metal Foil Example 69

90 Parts by mass of LiCoO$_2$ (tradename: "Selion C" manufactured by AGC Seimi Chemical Co., Ltd.), 5 parts by mass of carbon black (tradename: "DENKABLACK", manufactured by Denki Kagaku Kogyo Kabushiki Kaisha) and 5 parts by mass of polyvinylidene fluoride were mixed, and N-methyl-2-pyrrolidone was added to obtain a slurry. The slurry was applied uniformly on each side of a 20 μm aluminum foil, followed by drying and then by pressing so that the density of the positive electrode active material layer would be 3.0 g/cm$^3$, thereby to obtain a LiCoO$_2$ positive electrode.

The LiCoO$_2$ positive electrode, a lithium metal foil having the same area as the LiCoO$_2$ positive electrode, and a separator made of polyethylene, were laminated in a 2016 type coin cell in the order of the lithium metal foil, the separator and the LiCoO$_2$ positive electrode, to prepare a cell element, and the nonaqueous electrolyte prepared in Example 18 was added, followed by sealing to prepare a coin-type nonaqueous electrolyte secondary cell.

Example 70

Using the nonaqueous electrolyte prepared in Example 22, a coin-type secondary cell was prepared in the same manner as in Example 69.

Example 71

Using the nonaqueous electrolyte prepared in Example 32, a coin-type secondary cell was prepared in the same manner as in Example 69.

Example 72

Using the nonaqueous electrolyte prepared in Example 37, a coin-type secondary cell was prepared in the same manner as in Example 69.

Example 111

Using the nonaqueous electrolyte prepared in Example 105, a coin-type secondary cell was prepared in the same manner as in Example 69.

Example 112

Using the nonaqueous electrolyte prepared in Example 106, a coin-type secondary cell was prepared in the same manner as in Example 69.

Example 113

Using the nonaqueous electrolyte prepared in Example 107, a coin-type secondary cell was prepared in the same manner as in Example 69.

Example 114

A coin-type secondary cell was prepared in the same manner as in Example 69 except that a nonaqueous electrolyte prepared in the same manner as in Example 18 except that as a lithium salt in Example 18, TFSI-Li($CF_3SO_2N(Li)SO_2CF_3$) was used instead of $LiPF_6$, was used.

[Evaluation Method]

Evaluation of the cycle properties of the coin-type secondary cell with a single-pole cell comprising $LiCoO_2$ positive electrode-lithium metal foil, was carried out by the following method.

At 25° C., a cycle of charging to 4.2 V with constant current corresponding to 0.1 C and discharging to 3 V with constant current corresponding to 0.1 C, is repeated for 2 cycles. Further, a cycle of charging to 4.2 V with constant current corresponding to 0.25 C and discharging to 3 V with constant current corresponding to 0.25 C, is repeated for 2 cycles, to stabilize the secondary cell. In the 5th and subsequent cycles, a cycle of charging to the charging upper limit voltage with constant current of 0.5 C and further charging at the charging upper limit voltage until the current value became 0.05 C and thereafter discharging to 3 V at constant current of 0.5 C, is repeated, whereupon the maintenance ratio of the discharge capacity in the 80th cycle to the discharge capacity in the first cycle was taken as the evaluation result. Here, 1 C represents a current value for discharging a standard capacity of a cell in one hour, and 0.2 C represents a current value corresponding to 1/5 thereof. Further, the thickness of the coin-type cell after the 80 cycles was compared with the thickness before the test, whereby the presence or absence of generation of a gas was evaluated by the degree of the increase in the thickness.

The evaluation results are shown in Table 8.

TABLE 8

| Charging upper limit voltage (V vs Li/Li$^+$) | | Examples | | | | | Comparative Examples | | |
|---|---|---|---|---|---|---|---|---|---|
| | | Ex. 69 | Ex. 70 | Ex. 71 | Ex. 72 | Ex. 111 | Ex. 112 | Ex. 113 | Ex. 114 |
| 4.0 | Increase in thickness [mm] | — | <0.05 | — | — | — | — | — | — |
| | Discharge capacity-maintaining ratio (%) | — | 97 | — | — | — | — | — | — |
| 4.2 | Increase in thickness [mm] | <0.05 | <0.05 | <0.05 | <0.05 | <0.05 | <0.05 | 0.08 | — |
| | Discharge capacity-maintaining ratio (%) | 87 | 90 | 85 | 82 | 35 | 45 | 89 | Impossible to evaluate |
| 4.3 | Increase in thickness [mm] | <0.05 | — | <0.05 | <0.05 | — | — | 0.12 | — |
| | Discharge capacity-maintaining ratio (%) | 84 | — | 83 | 80 | — | — | 85 | — |
| 4.4 | Increase in thickness [mm] | — | <0.05 | | | | | 0.15 | — |
| | Discharge capacity-maintaining ratio (%) | — | 87 | — | — | Impossible to evaluate | Impossible to evaluate | 80 | — |

As is evident from Table 8, the secondary cells shown in Examples 69 to 72 had cycle properties equal to a secondary cell employing a carbonate type electrolyte, and in each case, increase in the thickness was prevented, and generation of a gas was substantially prevented. Whereas, in an electrolyte with a composition lacking in a part of the essential components for the electrolyte of the present invention, the cycle properties were inadequate. The secondary cell of Example 114 showed cycle properties up to the 72th cycle, but in the 73rd cycle, charging and discharging suddenly became impossible. This cell was disassembled, and the state of the positive electrode current collector aluminum was visually inspected and found to be heavily eroded. On the other hand, with the secondary cells of Examples 69 to 72, no erosion was observed when each cell after evaluation was disassembled, and the state of the positive electrode current collector aluminum was visually inspected.

Each of the coin-type nonaqueous electrolyte secondary cells of Examples 69 to 72 with a single pole cell comprising $LiCoO_2$ positive electrode-lithium metal foil, exhibits cycle properties equal to the secondary cell of Example 112 having an electrolyte employing a common carbonate and having the same shape as the nonaqueous electrolyte secondary cell.

Production Example 1

Example for preparation of 2,6,9,13-tetraoxatetradecane (1) Preparation of 3-methoxypropanol Methyl p-toluenesulfonate (140 g, 750 mmol), 1,3-propanediol (114 g, 1.5 mmol) and sodium hydride (product with purity of 55%, 13.1 g) were put into tetraethylene glycol dimethyl ether (200 ml) and reacted at 60° C. for 6 hours. After cooling, precipitated byproduct such as sodium p-toluenesulfonate was filtered off, and the filtered off crystals were washed with tetraethylene glycol dimethyl ether. The filtrate and the washing liquid were put together and subjected to distillation for purification to obtain 43.3 g (480 mmol, yield based on methyl p-toluenesulfonate: 64%) of the desired 3-methoxypropanol with a purity of at least 99% by gas chromatography.

(2) Preparation of 2,6,9,13-tetraoxatetradecane

The obtained 3-methoxypropanol (43.3 g, 480 mmol), 1,2-bis(p-tosyloxy)ethane (88.9 g, 240 mmol) and sodium hydride (product with a purity of 55%, 20.9 g) were put into diethylene glycol dimethyl ether (200 ml) and reacted at 60° C. for 6 hours. After cooling, precipitated byproduct such as sodium p-toluenesulfonate was filtered off, and the filtered off crystals were washed with diethylene glycol dimethyl ether. The filtrate and the washing liquid were put together and subjected to distillation for purification to obtain 45.1 g (180 mmol, yield based on 1,1,2-bis(p-tosyloxy)ethane: 75%) of the desired 2,6,9,13-tetraoxatetradecane with a purity of at least 99.5% by gas chromatography.

Example 73

2,6,9,13-Tetraoxatetradecane (2.50 g, 10.0 mmol) as an ether compound and the compound (1-2) (hereinafter referred to as CTFSI-Li) (2.49 g, 10.0 mmol) as a lithium salt were mixed in equimolar amounts, and then, HFE347pc-f (CF$_3$CH$_2$OCF$_2$CF$_2$H, 14.7 g, 10.0 ml) as a hydrofluoroether was added and mixed to obtain a nonaqueous electrolyte. With respect to the obtained nonaqueous electrolyte, a solubility test, a conductivity measurement, a potential window evaluation and an ignition test were carried out by the same methods as described above, whereby the solubility test was ○, the conductivity measurement was 0.25 S/m, the potential window evaluation was from less than 0.0 V to 4.70 V, and the ignition test was ○.

INDUSTRIAL APPLICABILITY

The nonaqueous electrolyte for a secondary cell and the secondary cell of the present invention are free from erosion of electrodes or generation of carbon dioxide gas. Further, they are provided with a long-term nonflammability, an excellent low-temperature characteristic and a practically sufficient conductivity. Therefore, they are useful for secondary cells in various applications such as cell phones, notebook computers, electric cars, etc. Further, the electrolyte of the present invention dissolves a lithium salt well and is excellent also in a nonflammability, and therefore, it can be used for other charge devices. As such other charge devices, an electrical double layer capacitor and a lithium ion capacity may be mentioned.

The entire disclosure of Japanese Patent Application No. 2008-116935 filed on Apr. 28, 2008 including specification, claims, drawings and summary is incorporated herein by reference in its entirety.

What is claimed is:

1. A nonaqueous electrolyte, which comprises a lithium salt, at least one hydrofluoroether selected from the group consisting of a compound represented by the following formula (2) and a compound represented by the following formula (3), and at least one compound represented by the following formula (4):

wherein each of $R^1$ and $R^2$ is a partially $C_{1-10}$ fluorinated alkyl group; X is a $C_{1-5}$ alkylene group, a $C_{1-5}$ partially fluorinated alkylene group, a $C_{1-5}$ alkylene group having an etheric oxygen atom between a carbon atom and a carbon atom, or a $C_{1-5}$ partially fluorinated alkylene group having an etheric oxygen atom between a carbon atom and a carbon atom; m is an integer of from 1 to 10; Q is an unsubstituted $C_{1-4}$ alkylene group, or a $C_{1-4}$ alkylene group substituted by a $C_{1-5}$ alkyl group or a $C_{1-5}$ alkyl group having an etheric oxygen atom between a carbon atom and a carbon atom, provided that when m is 2 or more, each Q is the same or different; and each of $R^{10}$ and $R^{11}$ which are independent of each other, is a $C_{1-5}$ alkyl group, or $R^{10}$ and $R^{11}$ are linked to each other to form a $C_{1-10}$ alkylene group, and wherein the lithium salt is at least one member selected from the group consisting of LiPF$_6$ and a compound represented by the following formula (1):

wherein n is an integer of from 1 to 5, and wherein the compound represented by formula (4) is present in an amount of from 0.5 to 2.0 times by mol, to the total amount of the lithium salt in the nonaqueous electrolyte.

2. The nonaqueous electrolyte according to claim 1, wherein the compound represented by the above formula (4) is a compound represented by the following formula (4A):

wherein m is an integer of from 1 to 10.

3. The nonaqueous electrolyte according to claim 1, wherein the lithium salt is a compound represented by the above formula (1) wherein n is 2.

4. The nonaqueous electrolyte according to claim 1, wherein the hydrofluoroether is at least one member selected from the group consisting of CF$_3$CH$_2$OCF$_2$CF$_2$H, CHF$_2$CF$_2$CH$_2$OCF$_2$CF$_2$H, CF$_3$CF$_2$CH$_2$OCF$_2$CHF$_2$ and CF$_3$CH$_2$OCF$_2$CHFCF$_3$.

5. The nonaqueous electrolyte according to claim 1, wherein the hydrofluoroether is a compound represented by the above formula (3) wherein X is one member selected from the group consisting of CH$_2$, CH$_2$CH$_2$, CH(CH$_3$)CH$_2$ and CH$_2$CH$_2$CH$_2$.

6. The nonaqueous electrolyte according to claim 1, wherein the compound represented by the above formula (4) is a compound represented by the above formula (4) wherein m is from 2 to 6.

7. The nonaqueous electrolyte according to claim 1, which further contains at least one compound (5) selected from the group consisting of a compound represented by the following formula (5-1), a compound represented by the following formula (5-2) and a compound represented by the following formula (5-3):

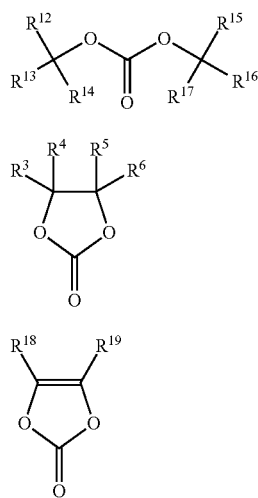

wherein each of $R^3$ to $R^6$ and $R^{12}$ to $R^{19}$ which are independent of one another, is a hydrogen atom, a halogen atom, an alkyl group or a halogenated alkyl group.

8. The nonaqueous electrolyte according to claim 7, wherein the content of the compound (5) is at most 10 vol % based on the total volume of the electrolyte.

9. The nonaqueous electrolyte according to claim 7, wherein the content of the compound (5) is from 0.1 to 0.45 vol % based on the total volume of the electrolyte.

10. The nonaqueous electrolyte according to claim 1, which has a conductivity of at least 0.25 S·m$^{-1}$ at 25° C.

11. The nonaqueous electrolyte according to claim 1, wherein the compound represented by the above formula (2) is present.

12. The nonaqueous electrolyte according to claim 1, wherein the compound represented by the above formula (3) is present.

13. The nonaqueous electrolyte according to claim 1, wherein X is a $C_{1-5}$ alkylene group, a $C_{1-5}$ partially fluorinated alkylene group, or a $C_{1-5}$ partially fluorinated alkylene group having an etheric oxygen atom between a carbon atom and a carbon atom.

14. The nonaqueous electrolyte according to claim 1, wherein the hydrofluoroether is present in an amount of from 50 to 90 vol % based on 100% of the total amount of solvents in the nonaqueous electrolyte.

15. A secondary cell comprising a negative electrode made of a material capable of storing or discharging lithium ions electrochemically, or metal lithium or a lithium alloy, a positive electrode made of a material capable of storing or discharging lithium ions electrochemically, and the nonaqueous electrolyte as defined in claim 1.

16. The secondary cell according to claim 15, which is configured to be applicable at a potential of the positive electrode being at least 3.4 V as a potential based on lithium metal.

* * * * *